United States Patent
Yao et al.

(10) Patent No.: US 10,893,485 B2
(45) Date of Patent: Jan. 12, 2021

(54) CARRIER POWER CONTROL METHOD AND APPARATUS, STORAGE MEDIUM, AND COMPUTER PROGRAM PRODUCT

(71) Applicant: Huawei Technologies Co., Ltd., Shenzhen (CN)

(72) Inventors: Guoqiang Yao, Shanghai (CN); Guowei Li, Shanghai (CN); Yan Zhang, Shanghai (CN); Hongbao Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/728,297

(22) Filed: Dec. 27, 2019

(65) Prior Publication Data

US 2020/0137697 A1 Apr. 30, 2020

Related U.S. Application Data

(63) Continuation of application No. PCT/CN2017/090566, filed on Jun. 28, 2017.

(51) Int. Cl.
*H04W 52/24* (2009.01)
*H04W 52/34* (2009.01)
*H04W 52/14* (2009.01)
*H04W 52/36* (2009.01)

(52) U.S. Cl.
CPC ....... *H04W 52/346* (2013.01); *H04W 52/143* (2013.01); *H04W 52/367* (2013.01)

(58) Field of Classification Search
CPC ............ H04W 52/346; H04W 52/367; H04W 52/243

USPC ...................................................... 455/522, 69
See application file for complete search history.

(56) References Cited

U.S. PATENT DOCUMENTS

| | | | | |
|---|---|---|---|---|
| 7,489,943 B2 * | 2/2009 | Jones | .................. | H04W 52/286 455/126 |
| 7,689,240 B2 * | 3/2010 | Anderson | .............. | H04B 17/27 455/522 |
| 7,881,340 B2 * | 2/2011 | Farrag | ................... | H04W 74/02 370/468 |

(Continued)

FOREIGN PATENT DOCUMENTS

| CN | 101083496 A | 12/2007 |
|---|---|---|
| CN | 101154968 A | 4/2008 |

(Continued)

OTHER PUBLICATIONS

Schuh, R. E., et al., "W-CDMA Coverage and Capacity Analysis for Active and Passive Distributed Antenna Systems", May 6, 2002, pp. 434-438, XP001210423.

*Primary Examiner* — Hai V Nguyen
(74) *Attorney, Agent, or Firm* — Slater Matsil, LLP

(57) ABSTRACT

A method includes: setting a maximum transmit power of common channels of a plurality of carriers based on a signal coverage; setting a maximum transmit power of traffic channels of the plurality of carriers; and transmitting, for each scheduling period and based on the maximum transmit power of the common channels of the plurality of carriers, the maximum transmit power of the traffic channels of the plurality of carriers and a shared transmit power of the traffic channels of the plurality of carriers in the scheduling period, the plurality of carriers in the scheduling period.

20 Claims, 6 Drawing Sheets

(56) References Cited

U.S. PATENT DOCUMENTS

| | | | |
|---|---|---|---|
| 8,060,017 B2* | 11/2011 | Schlicht | H04L 1/0015 455/41.2 |
| 8,140,101 B1 | 3/2012 | Wurtenberger et al. | |
| 8,380,240 B2* | 2/2013 | Muharemovic | H04W 56/0045 455/524 |
| 8,385,909 B1* | 2/2013 | Bhan | H04W 24/04 455/424 |
| 8,792,423 B2* | 7/2014 | Lu | H04W 52/0254 370/328 |
| 8,934,436 B2* | 1/2015 | Dinan | H04W 72/1231 370/329 |
| 9,185,664 B2* | 11/2015 | Park | H04W 52/40 |
| 9,231,666 B2* | 1/2016 | Muharemovic | H04B 7/024 |
| 9,473,219 B2* | 10/2016 | Muharemovic | H04W 56/0045 |
| 9,591,651 B2* | 3/2017 | Dinan | H04W 72/0446 |
| 9,894,558 B2* | 2/2018 | Koskinen | H04W 28/02 |
| 10,200,904 B2* | 2/2019 | Zhang | H04L 41/08 |
| 10,231,236 B2* | 3/2019 | Dinan | H04L 1/06 |
| 10,374,887 B2* | 8/2019 | Kerpez | H04L 41/14 |
| 10,440,685 B2* | 10/2019 | Zhu | H04W 72/04 |
| 10,700,796 B2* | 6/2020 | Dinan | H04W 72/042 |
| 2005/0222933 A1* | 10/2005 | Wesby | H04W 4/00 705/36 R |
| 2006/0142040 A1* | 6/2006 | Jones | H04W 52/286 455/522 |
| 2006/0289649 A1* | 12/2006 | Sugiura | G06K 19/0715 235/451 |
| 2007/0111746 A1* | 5/2007 | Anderson | H04W 52/223 455/522 |
| 2009/0060081 A1* | 3/2009 | Zhang | H04W 72/0446 375/267 |
| 2009/0252134 A1* | 10/2009 | Schlicht | H04W 40/08 370/338 |
| 2010/0142421 A1* | 6/2010 | Schlicht | H04W 4/23 370/310 |
| 2010/0142445 A1* | 6/2010 | Schlicht | H04W 4/23 370/328 |
| 2010/0142446 A1* | 6/2010 | Schlicht | H04W 4/23 370/328 |
| 2010/0172340 A1* | 7/2010 | Muharemovic | H04W 56/0065 370/350 |
| 2010/0316033 A1* | 12/2010 | Atwal | H04W 74/002 370/338 |
| 2011/0019652 A1* | 1/2011 | Atwal | H04W 74/002 370/338 |
| 2011/0117921 A1* | 5/2011 | Gannholm | H04L 5/0091 455/450 |
| 2012/0057547 A1* | 3/2012 | Lohr | H04L 5/0064 370/329 |
| 2012/0106428 A1* | 5/2012 | Schlicht | H04L 45/308 370/312 |
| 2012/0270593 A1* | 10/2012 | Park | H04W 52/40 455/522 |
| 2013/0016649 A1* | 1/2013 | Damnjanovic | H04W 88/04 370/315 |
| 2013/0021932 A1* | 1/2013 | Damnjanovic | H04W 52/0229 370/252 |
| 2013/0155956 A1* | 6/2013 | Muharemovic | H04B 7/024 370/328 |
| 2013/0273926 A1* | 10/2013 | Peng | H04B 7/15528 455/450 |
| 2014/0105135 A1* | 4/2014 | Tellado | H04B 7/15528 370/329 |
| 2014/0126386 A1 | 5/2014 | Beale | |
| 2015/0117417 A1* | 4/2015 | Muharemovic | H04B 7/024 370/336 |
| 2015/0131536 A1* | 5/2015 | Kaur | H04L 5/0055 370/329 |
| 2015/0138984 A1* | 5/2015 | Dominguez Romero | H04W 28/0221 370/236 |
| 2015/0264592 A1* | 9/2015 | Novlan | H04W 52/0206 370/252 |
| 2016/0227479 A1* | 8/2016 | Ma | H04W 48/16 |
| 2016/0345345 A1* | 11/2016 | Malik | H04W 16/14 |
| 2016/0381589 A1* | 12/2016 | Zhang | H04W 24/10 370/252 |
| 2017/0141906 A1* | 5/2017 | Rainish | H04L 5/0073 |
| 2017/0272311 A1* | 9/2017 | Kerpez | H04L 41/0672 |
| 2017/0311200 A1* | 10/2017 | Koskinen | H04W 76/27 |
| 2018/0205428 A1* | 7/2018 | Lan | H04B 7/04 |
| 2018/0211207 A1* | 7/2018 | Maijala | G06Q 10/087 |
| 2018/0249509 A1* | 8/2018 | Yi | H04W 48/16 |
| 2018/0323920 A1* | 11/2018 | Zhu | H04L 5/0044 |
| 2018/0324762 A1* | 11/2018 | Zhu | H04W 72/04 |
| 2019/0230601 A1* | 7/2019 | Falconetti | H04W 52/281 |
| 2019/0239169 A1* | 8/2019 | Medina Acosta | H04W 52/346 |
| 2019/0342037 A1* | 11/2019 | Karaki | H04W 16/14 |
| 2019/0349249 A1* | 11/2019 | Kerpez | H04L 41/0672 |
| 2019/0356524 A1* | 11/2019 | Yi | H04L 27/2602 |
| 2019/0364601 A1* | 11/2019 | Kazmi | H04W 16/26 |
| 2020/0022160 A1* | 1/2020 | Zou | H04W 72/1242 |
| 2020/0037186 A1* | 1/2020 | Thangarasa | H04L 1/1812 |
| 2020/0107259 A1* | 4/2020 | Allanki | H04W 48/20 |
| 2020/0137601 A1* | 4/2020 | Siomina | H04W 24/10 |
| 2020/0137697 A1* | 4/2020 | Yao | H04W 52/246 |
| 2020/0267753 A1* | 8/2020 | Adjakple | H04W 72/14 |

FOREIGN PATENT DOCUMENTS

| | | |
|---|---|---|
| CN | 101902749 A | 12/2010 |
| CN | 102164402 A | 8/2011 |
| CN | 102256346 A | 11/2011 |
| EP | 1793509 A1 | 6/2007 |

* cited by examiner

CARRIER POWER CONTROL METHOD AND APPARATUS, STORAGE MEDIUM, AND COMPUTER PROGRAM PRODUCT

CROSS-REFERENCE TO RELATED APPLICATIONS

This application is a continuation of International Application No. PCT/CN2017/090566, filed on Jun. 28, 2017, the disclosure of which is hereby incorporated by reference in its entirety.

TECHNICAL FIELD

This application relates to the field of communication technologies, and in particular, to a carrier power control method and apparatus, a storage medium, and a computer program product.

BACKGROUND

With continuous development of communications technologies, an exposure level of electromagnetic radiation gradually increases, and electromagnetic radiation has become another major pollution after air pollution, water pollution and noise pollution. A base station, as a most common signal transmission device in the communications field, is one of the main sources of electromagnetic radiation. Electromagnetic radiation of the base station is usually limited to avoid excessively high electromagnetic radiation of the base station, and to avoid harming health of people. Because the electromagnetic radiation of the base station is related to a transmit power of a carrier, in other words, a higher transmit power of the carrier causes higher electromagnetic radiation, the base station usually limits the electromagnetic radiation of the base station by controlling a total transmit power of the carrier.

Currently, when electromagnetic radiation is not limited, a base station may set a transmit power of a carrier based on a maximum power that the base station can provide. However, when the base station limits the electromagnetic radiation, the transmit power of the carrier that is set by the base station when the electromagnetic radiation is not limited is usually decreased based on a uniform ratio, so that a total transmit power of a carrier of the base station is lower than a power limited by the electromagnetic radiation. Subsequently, the base station may control, based on the transmit power of the carrier that is decreased based on the uniform ratio, transmission of the carrier in each scheduling period, so that the electromagnetic radiation of the base station satisfies a design requirement.

For example, as shown in FIG. 1, when electromagnetic radiation is not limited, a base station may set transmit powers of a carrier 1 and a carrier 2 based on a maximum power that the base station can provide. In this case, the transmit power of the carrier 1 is P1, and the transmit power of the carrier 2 is P2. However, when the base station limits the electromagnetic radiation, the transmit powers of the carriers that are set by the base station when the electromagnetic radiation is not limited are decreased based on the uniform ratio. In this case, the transmit power of the carrier 1 is decreased from P1 to P3, and the transmit power of the carrier 2 is decreased from P2 to P4. Subsequently, the base station may control, based on the transmit power P3 of the carrier 1 and the transmit power P4 of the carrier 2, transmission of the carrier 1 and the carrier 2 in each scheduling period.

A carrier generally includes a common channel and a traffic channel. For example, the carrier 1 includes a common channel 1 and a traffic channel 1, and the carrier 2 includes a common channel 2 and a traffic channel 2. Decreasing the transmit power of the carrier based on the uniform ratio indicates that both the transmit powers of the common channel and the traffic channel of the carrier are decreased based on the uniform ratio. For example, a transmit power of the common channel 1 of the carrier 1 is decreased from P5 to P6, and a transmit power of the traffic channel 1 of the carrier 1 is decreased from P7 to P8. When the transmit power of the common channel of the carrier is decreased, a coverage of a main lobe in a radiation beam of an antenna of the base station shrinks. As a result, a cell coverage of the base station is narrowed. Consequently, a cell capacity is decreased. In addition, a cell service throughput of the base station is also reduced as the transmit power of the traffic channel of the carrier is decreased.

SUMMARY

To resolve a problem in related technologies that a cell coverage of a base station is narrowed and a cell service throughput of the base station is reduced, this application provides a carrier power control method and apparatus, a storage medium, and a computer program product. The technical solutions are as follows.

According to a first aspect, a carrier power control method is provided. The method is applied to a network device, and includes: setting, based on a signal coverage of the network device, a maximum transmit power of common channels of a plurality of to-be-transmitted carriers; setting, based on a total signal transmit power of the network device and the maximum transmit power of the common channels of the plurality of carriers, a maximum transmit power of traffic channels of the plurality of carriers; transmitting, for each scheduling period and based on the maximum transmit power of the common channels of the plurality of carriers, the maximum transmit power of the traffic channels of the plurality of carriers and a shared transmit power of the traffic channels of the plurality of carriers in the scheduling period, the plurality of carriers in the scheduling period, where the shared transmit power of the traffic channels of the plurality of carriers in the scheduling period is obtained after setting a plurality of shared traffic powers of a scheduling period previous to the scheduling period for the traffic channels of the plurality of carriers, and the plurality of shared traffic powers of the previous scheduling period are obtained through determining based on the maximum transmit power of the traffic channels of the plurality of carriers and an actual transmit power of the traffic channels of the plurality of carriers in the previous scheduling period.

It should be noted that the plurality of carriers include carriers of different standards and/or different frequency bands.

In this embodiment of the present invention, after the maximum transmit power of the common channels of the plurality of carriers is set based on the signal coverage of the network device, the network device may transmit the common channels of the plurality of carriers at the maximum transmit power of the common channels of the plurality of carriers. In this case, a coverage of the common channels of the plurality of carriers can reach a signal coverage pre-planned by the network device, to ensure that the signal coverage of the network device is not narrowed. In addition, a traffic throughput of the traffic channels of the plurality of carriers is improved by sharing a plurality of shared powers with the traffic channels of the plurality of carriers for use, without reducing the maximum transmit power of the common channels of the plurality of carriers, that is, without narrowing the signal coverage of the network device.

Further, after transmitting the plurality of carriers in the scheduling period, the method further includes: determining an actual transmit power of the traffic channels of the plurality of carriers in the scheduling period; determining, based on the maximum transmit power of the traffic channels of the plurality of carriers and the actual transmit power of the traffic channels of the plurality of carriers in the scheduling period, a plurality of shared traffic powers of the scheduling period; and setting the plurality of shared traffic powers of the scheduling period for the traffic channels of the plurality of carriers, to obtain a shared transmit power of the traffic channels of the plurality of carriers in a next scheduling period relative to the scheduling period.

Determining, based on the maximum transmit power of the traffic channels of the plurality of carriers and the actual transmit power of the traffic channels of the plurality of carriers in the scheduling period, a plurality of shared traffic powers of the scheduling period includes: determining, for each carrier in the plurality of carriers, when a power obtained by subtracting an actual transmit power of a traffic channel of the carrier in the scheduling period from a maximum transmit power of the traffic channel of the carrier is greater than a preset power, the obtained power as a shared traffic power of the scheduling period.

In this embodiment of the present invention, only when there is a relatively large difference between an actual power used by the traffic channel of the carrier and a power set for the traffic channel of the carrier, all powers that are not used by the traffic channel of the carrier in the scheduling period are determined as the shared traffic power of the scheduling period, to ensure that normal transmission of the traffic channel of the carrier is not affected when the shared traffic power is subsequently shared with a traffic channel of another carrier.

Setting the plurality of shared traffic powers of the scheduling period for the traffic channels of the plurality of carriers, to obtain a shared transmit power of the traffic channels of the plurality of carriers in a next scheduling period relative to the scheduling period, includes: determining a plurality of target traffic channels in the traffic channels of the plurality of carriers, where the plurality of target traffic channels are channels whose traffic performance needs to be improved; and setting the plurality of shared traffic powers of the scheduling period for the plurality of target traffic channels, to obtain a shared transmit power of the plurality of target traffic channels in a next scheduling period relative to the scheduling period.

It should be noted that a target traffic channel is a channel with relatively low traffic performance. For example, the target traffic channel may be a channel with a modulation order lower than a preset order, a channel carrying a traffic data volume greater than a preset data volume, a channel with a quantity of traffic data retransmission times greater than a preset quantity of times, a channel with a signal-to-noise ratio lower than a preset ratio, or the like. This is not limited in this embodiment of the present invention. The preset order, the preset data volume, the preset quantity of times, and the preset ratio may all be preset. This is not limited in this embodiment of the present invention.

The method further includes: keeping, for each carrier in the plurality of carriers, when the carrier is a carrier communicating with a near point terminal, the maximum transmit power of the traffic channel of the carrier unchanged, increasing a quantity of resource blocks (RBs) occupied by the traffic channel of the carrier, and decreasing a power spectrum density of the traffic channel of the carrier, where a distance between the near point terminal and the network device is less than a preset distance; and keeping, when the carrier is a carrier communicating with a far point terminal, the maximum transmit power of the traffic channel of the carrier unchanged, decreasing the quantity of the RBs occupied by the traffic channel of the carrier, and increasing the power spectrum density of the traffic channel of the carrier, where a distance between the far point terminal and the network device is not less than the preset distance.

A bandwidth of the near point terminal is usually limited. Therefore, a transmission rate that can be improved by increasing the quantity of RBs occupied by the traffic channel of the carrier communicating with the near point terminal, that is, by increasing an available bandwidth of the near point terminal is greater than a transmission rate that is decreased by decreasing a power spectrum density of the traffic channel of the carrier, so that a transmission rate of the traffic channel of the carrier is increased, thereby improving a traffic throughput of the traffic channel of the carrier. A power of the far point terminal is usually limited. Therefore, a transmission rate that can be improved by increasing the power spectrum density of the traffic channel of the carrier communicating with the far point terminal, that is, by increasing an available power of the far point terminal is greater than a transmission rate that is decreased by decreasing the quantity of RBs occupied by the traffic channel of the carrier, so that a transmission rate of the traffic channel of the carrier is increased, thereby improving a traffic throughput of the traffic channel of the carrier. In other words, in this embodiment of the present invention, by dynamically adjusting a power resource and a spectrum resource, the traffic throughput of the traffic channel of the carrier may be improved when the maximum transmit power of the traffic channel of the carrier keeps unchanged.

According to a second aspect, a carrier power control apparatus is provided. The carrier power control apparatus includes a function of implementing the carrier power control method in the foregoing first aspect. The carrier power control apparatus includes at least one module, and the at least one module is configured to implement the carrier power control method provided in the foregoing first aspect.

According to a third aspect, a carrier power control apparatus is provided. A structure of the carrier power control apparatus includes a processor and a memory. The memory is configured to: store a program that supports the carrier power control apparatus in performing the carrier power control method provided in the foregoing first aspect, and store related data used to implement the carrier power control method in the foregoing first aspect. The processor is configured to execute the program stored in the memory. The carrier power control apparatus may also include a communications bus, and the communications bus is configured to build a connection between the processor and the memory.

According to a fourth aspect, a computer readable storage medium is provided. The computer readable storage medium stores an instruction, and the instruction, when run on a computer, causes the computer to perform the carrier power control method in the foregoing first aspect.

According to a fifth aspect, a computer program product including an instruction is provided. The computer program product, when run on a computer, causes the computer to perform the carrier power control method in the foregoing first aspect.

Technical effects obtained by the second aspect, the third aspect, the fourth aspect and the fifth aspect are similar to a technical effect obtained by a corresponding technical means in the first aspect, and details are not described herein again.

According to a sixth aspect, a carrier power control method is provided. The method is applied to a network device, and includes: setting, based on a signal coverage of the network device, a maximum transmit power of common channels of a plurality of to-be-transmitted carriers; setting, based on a total signal transmit power of the network device and the maximum transmit power of the common channels of the plurality of carriers, a maximum transmit power of traffic channels of the plurality of carriers; keeping, for each carrier in the plurality of carriers, when the carrier is a carrier communicating with a near point terminal, the maximum transmit power of the traffic channel of the carrier unchanged, increasing a quantity of resource blocks (RBs) occupied by the traffic channel of the carrier, and decreasing a power spectrum density of the traffic channel of the carrier, where a distance between the near point terminal and the network device is less than a preset distance; and keeping, when the carrier is a carrier communicating with a far point terminal, the maximum transmit power of the traffic channel of the carrier unchanged, decreasing the quantity of the RBs occupied by the traffic channel of the carrier, and increasing the power spectrum density of the traffic channel of the carrier, where a distance between the far point terminal and the network device is not less than the preset distance.

A bandwidth of the near point terminal is usually limited. Therefore, a transmission rate that can be improved by increasing the quantity of RBs occupied by the traffic channel of the carrier communicating with the near point terminal, that is, by increasing an available bandwidth of the near point terminal is greater than a transmission rate that is decreased by decreasing a power spectrum density of the traffic channel of the carrier, so that a transmission rate of the traffic channel of the carrier is increased, thereby improving a traffic throughput of the traffic channel of the carrier. A power of the far point terminal is usually limited. Therefore, a transmission rate that can be improved by increasing the power spectrum density of the traffic channel of the carrier communicating with the far point terminal, that is, by increasing an available power of the far point terminal is greater than a transmission rate that is decreased by decreasing the quantity of RBs occupied by the traffic channel of the carrier, so that a transmission rate of the traffic channel of the carrier is increased, thereby improving a traffic throughput of the traffic channel of the carrier. In other words, in this embodiment of the present invention, by dynamically adjusting a power resource and a spectrum resource, the traffic throughput of the traffic channel of the carrier may be improved when the maximum transmit power of the traffic channel of the carrier keeps unchanged.

According to a seventh aspect, a carrier power control apparatus is provided. The carrier power control apparatus includes a function of implementing the carrier power control method behavior in the foregoing sixth aspect. The carrier power control apparatus includes at least one module, and the at least one module is configured to implement the carrier power control method provided in the foregoing sixth aspect.

According to an eighth aspect, a carrier power control apparatus is provided. A structure of the carrier power control apparatus includes a processor and a memory. The memory is configured to: store a program that supports the carrier power control apparatus in performing the carrier power control method provided in the foregoing sixth aspect, and store related data used to implement the carrier power control method in the foregoing sixth aspect. The processor is configured to execute the program stored in the memory. The carrier power control apparatus may also include a communications bus, and the communications bus is configured to build a connection between the processor and the memory.

According to a ninth aspect, a computer readable storage medium is provided. The computer readable storage medium stores an instruction, and the instruction, when run on a computer, causes the computer to perform the carrier power control method in the foregoing sixth aspect.

According to a tenth aspect, a computer program product including an instruction is provided. The instruction, when run on a computer, causes the computer to perform the carrier power control method in the foregoing sixth aspect.

Technical effects obtained by the seventh aspect, the eighth aspect, the ninth aspect and the tenth aspect are similar to a technical effect obtained by a corresponding technical means in the sixth aspect, and details are not described herein again.

A beneficial effect of the technical solutions provided by this application is as follows. First, the maximum transmit power of the common channels of the plurality of to-be-transmitted carriers is set based on the signal coverage of the network device, to ensure that the signal coverage of the network device is not narrowed. Then the maximum transmit power of traffic channels of the plurality of carriers is set based on the total signal transmit power of the network device and the maximum transmit power of the common channels of the plurality of carriers. For each scheduling period, the plurality of shared traffic powers of the scheduling period previous to the scheduling period are determined based on the maximum transmit power of the traffic channels of the plurality of carriers and the actual transmit power of the traffic channels of the plurality of carriers in the previous scheduling period, and the plurality of shared traffic powers of the previous scheduling period are set for the traffic channels of the plurality of carriers, to obtain the shared transmit power of the traffic channels of the plurality of carriers in the scheduling period. Subsequently, the plurality of carriers are transmitted in the scheduling period based on the maximum transmit power of the common channels of the plurality of carriers, the maximum transmit power of the traffic channels of the plurality of carriers, and the shared transmit power of the traffic channels of the plurality of carriers in the scheduling period, so that the traffic throughput of the traffic channels of the plurality of carriers is improved by sharing, without narrowing the signal coverage of the network device, the plurality of shared powers with the traffic channels of the plurality of carriers for use.

DETAILED DESCRIPTION OF ILLUSTRATIVE EMBODIMENTS

Figure 1:
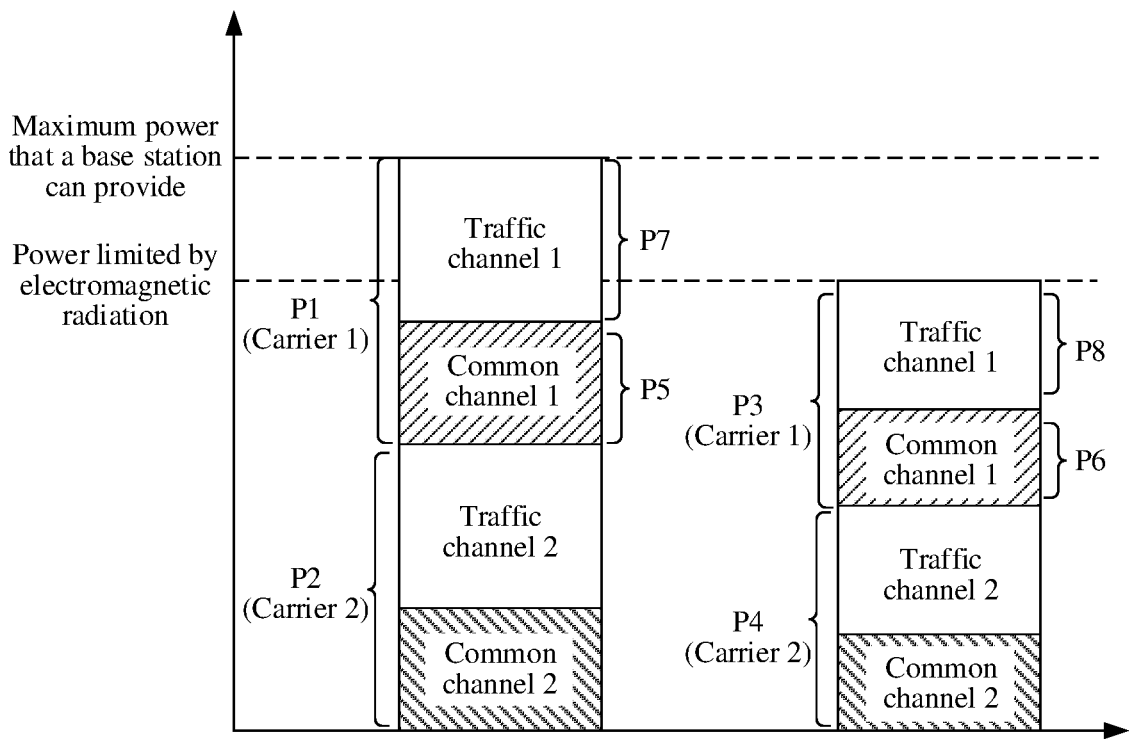
FIG. 1 is a schematic diagram of a transmit power of a carrier in a related technology according to an embodiment of the present invention.

To resolve a problem in related technologies that a cell coverage of a base station is narrowed and a cell service throughput of the base station is reduced, this application provides a carrier power control method and apparatus, a storage medium, and a computer program product. The technical solutions are as follows.

According to a first aspect, a carrier power control method is provided. The method is applied to a network device, and includes: setting, based on a signal coverage of the network device, a maximum transmit power of common channels of a plurality of to-be-transmitted carriers; setting, based on a total signal transmit power of the network device and the maximum transmit power of the common channels of the plurality of carriers, a maximum transmit power of traffic channels of the plurality of carriers; transmitting, for each scheduling period and based on the maximum transmit power of the common channels of the plurality of carriers, the maximum transmit power of the traffic channels of the plurality of carriers and a shared transmit power of the traffic channels of the plurality of carriers in the scheduling period, the plurality of carriers in the scheduling period, where the shared transmit power of the traffic channels of the plurality of carriers in the scheduling period is obtained after setting a plurality of shared traffic powers of a scheduling period previous to the scheduling period for the traffic channels of the plurality of carriers, and the plurality of shared traffic powers of the previous scheduling period are obtained through determining based on the maximum transmit power of the traffic channels of the plurality of carriers and an actual transmit power of the traffic channels of the plurality of carriers in the previous scheduling period.

It should be noted that the plurality of carriers include carriers of different standards and/or different frequency bands.

In this embodiment of the present invention, after the maximum transmit power of the common channels of the plurality of carriers is set based on the signal coverage of the network device, the network device may transmit the common channels of the plurality of carriers at the maximum transmit power of the common channels of the plurality of carriers. In this case, a coverage of the common channels of the plurality of carriers can reach a signal coverage pre-planned by the network device, to ensure that the signal coverage of the network device is not narrowed. In addition, a traffic throughput of the traffic channels of the plurality of carriers is improved by sharing a plurality of shared powers with the traffic channels of the plurality of carriers for use, without reducing the maximum transmit power of the common channels of the plurality of carriers, that is, without narrowing the signal coverage of the network device.

Further, after the transmitting the plurality of carriers in the scheduling period, the method further includes: determining an actual transmit power of the traffic channels of the plurality of carriers in the scheduling period; determining, based on the maximum transmit power of the traffic channels of the plurality of carriers and the actual transmit power of the traffic channels of the plurality of carriers in the scheduling period, a plurality of shared traffic powers of the scheduling period; and setting the plurality of shared traffic powers of the scheduling period for the traffic channels of the plurality of carriers, to obtain a shared transmit power of the traffic channels of the plurality of carriers in a next scheduling period relative to the scheduling period.

Determining, based on the maximum transmit power of the traffic channels of the plurality of carriers and the actual transmit power of the traffic channels of the plurality of carriers in the scheduling period, a plurality of shared traffic powers of the scheduling period includes: determining, for each carrier in the plurality of carriers, when a power obtained by subtracting an actual transmit power of a traffic channel of the carrier in the scheduling period from a maximum transmit power of the traffic channel of the carrier is greater than a preset power, the obtained power as a shared traffic power of the scheduling period.

In this embodiment of the present invention, only when there is a relatively large difference between an actual power used by the traffic channel of the carrier and a power set for the traffic channel of the carrier, all powers that are not used by the traffic channel of the carrier in the scheduling period are determined as the shared traffic power of the scheduling period, to ensure that normal transmission of the traffic channel of the carrier is not affected when the shared traffic power is subsequently shared with a traffic channel of another carrier.

Setting the plurality of shared traffic powers of the scheduling period for the traffic channels of the plurality of carriers, to obtain a shared transmit power of the traffic channels of the plurality of carriers in a next scheduling period relative to the scheduling period, includes: determining a plurality of target traffic channels in the traffic channels of the plurality of carriers, where the plurality of target traffic channels are channels whose traffic performance needs to be improved; and setting the plurality of shared traffic powers of the scheduling period for the plurality of target traffic channels, to obtain a shared transmit power of the plurality of target traffic channels in a next scheduling period relative to the scheduling period.

It should be noted that a target traffic channel is a channel with relatively low traffic performance. For example, the target traffic channel may be a channel with a modulation order lower than a preset order, a channel carrying a traffic data volume greater than a preset data volume, a channel with a quantity of traffic data retransmission times greater than a preset quantity of times, a channel with a signal-to-noise ratio lower than a preset ratio, or the like. This is not limited in this embodiment of the present invention. The preset order, the preset data volume, the preset quantity of times, and the preset ratio may all be preset. This is not limited in this embodiment of the present invention.

The method further includes: keeping, for each carrier in the plurality of carriers, when the carrier is a carrier communicating with a near point terminal, the maximum transmit power of the traffic channel of the carrier unchanged, increasing a quantity of resource blocks (RBs) occupied by the traffic channel of the carrier, and decreasing a power spectrum density of the traffic channel of the carrier, where a distance between the near point terminal and the network device is less than a preset distance; and keeping, when the carrier is a carrier communicating with a far point terminal, the maximum transmit power of the traffic channel of the carrier unchanged, decreasing the quantity of the RBs occupied by the traffic channel of the carrier, and increasing the power spectrum density of the traffic channel of the carrier, where a distance between the far point terminal and the network device is not less than the preset distance.

A bandwidth of the near point terminal is usually limited. Therefore, a transmission rate that can be improved by increasing the quantity of RBs occupied by the traffic channel of the carrier communicating with the near point terminal, that is, by increasing an available bandwidth of the near point terminal is greater than a transmission rate that is decreased by decreasing a power spectrum density of the traffic channel of the carrier, so that a transmission rate of the traffic channel of the carrier is increased, thereby improving a traffic throughput of the traffic channel of the carrier. A power of the far point terminal is usually limited. Therefore, a transmission rate that can be improved by increasing the power spectrum density of the traffic channel of the carrier communicating with the far point terminal, that is, by increasing an available power of the far point terminal is greater than a transmission rate that is decreased by decreasing the quantity of RBs occupied by the traffic channel of the carrier, so that a transmission rate of the traffic channel of the carrier is increased, thereby improving a traffic throughput of the traffic channel of the carrier. In other words, in this embodiment of the present invention, by dynamically adjusting a power resource and a spectrum resource, the traffic throughput of the traffic channel of the carrier may be improved when the maximum transmit power of the traffic channel of the carrier keeps unchanged.

According to a second aspect, a carrier power control apparatus is provided. The carrier power control apparatus includes a function of implementing the carrier power control method in the foregoing first aspect. The carrier power control apparatus includes at least one module, and the at least one module is configured to implement the carrier power control method provided in the foregoing first aspect.

According to a third aspect, a carrier power control apparatus is provided. A structure of the carrier power control apparatus includes a processor and a memory. The memory is configured to: store a program that supports the carrier power control apparatus in performing the carrier power control method provided in the foregoing first aspect, and store related data used to implement the carrier power control method in the foregoing first aspect. The processor is configured to execute the program stored in the memory. The carrier power control apparatus may also include a communications bus, and the communications bus is configured to build a connection between the processor and the memory.

According to a fourth aspect, a computer readable storage medium is provided. The computer readable storage medium stores an instruction, and the instruction, when run on a computer, causes the computer to perform the carrier power control method in the foregoing first aspect.

According to a fifth aspect, a computer program product including an instruction is provided. The computer program product, when run on a computer, causes the computer to perform the carrier power control method in the foregoing first aspect.

Technical effects obtained by the second aspect, the third aspect, the fourth aspect and the fifth aspect are similar to a technical effect obtained by a corresponding technical means in the first aspect, and details are not described herein again.

According to a sixth aspect, a carrier power control method is provided. The method is applied to a network device, and includes: setting, based on a signal coverage of the network device, a maximum transmit power of common channels of a plurality of to-be-transmitted carriers; setting, based on a total signal transmit power of the network device and the maximum transmit power of the common channels of the plurality of carriers, a maximum transmit power of traffic channels of the plurality of carriers; keeping, for each carrier in the plurality of carriers, when the carrier is a carrier communicating with a near point terminal, the maximum transmit power of the traffic channel of the carrier unchanged, increasing a quantity of resource blocks (RBs) occupied by the traffic channel of the carrier, and decreasing a power spectrum density of the traffic channel of the carrier, where a distance between the near point terminal and the network device is less than a preset distance; and keeping, when the carrier is a carrier communicating with a far point terminal, the maximum transmit power of the traffic channel of the carrier unchanged, decreasing the quantity of the RBs occupied by the traffic channel of the carrier, and increasing the power spectrum density of the traffic channel of the carrier, where a distance between the far point terminal and the network device is not less than the preset distance.

A bandwidth of the near point terminal is usually limited. Therefore, a transmission rate that can be improved by increasing the quantity of RBs occupied by the traffic channel of the carrier communicating with the near point terminal, that is, by increasing an available bandwidth of the near point terminal is greater than a transmission rate that is decreased by decreasing a power spectrum density of the traffic channel of the carrier, so that a transmission rate of the traffic channel of the carrier is increased, thereby improving a traffic throughput of the traffic channel of the carrier. A power of the far point terminal is usually limited. Therefore, a transmission rate that can be improved by increasing the power spectrum density of the traffic channel of the carrier communicating with the far point terminal, that is, by increasing an available power of the far point terminal is greater than a transmission rate that is decreased by decreasing the quantity of RBs occupied by the traffic channel of the carrier, so that a transmission rate of the traffic channel of the carrier is increased, thereby improving a traffic throughput of the traffic channel of the carrier. In other words, in this embodiment of the present invention, by dynamically adjusting a power resource and a spectrum resource, the traffic throughput of the traffic channel of the carrier may be improved when the maximum transmit power of the traffic channel of the carrier keeps unchanged.

According to a seventh aspect, a carrier power control apparatus is provided. The carrier power control apparatus includes a function of implementing the carrier power control method behavior in the foregoing sixth aspect. The carrier power control apparatus includes at least one module, and the at least one module is configured to implement the carrier power control method provided in the foregoing sixth aspect.

According to an eighth aspect, a carrier power control apparatus is provided. A structure of the carrier power control apparatus includes a processor and a memory. The memory is configured to: store a program that supports the carrier power control apparatus in performing the carrier power control method provided in the foregoing sixth aspect, and store related data used to implement the carrier power control method in the foregoing sixth aspect. The processor is configured to execute the program stored in the memory. The carrier power control apparatus may also include a communications bus, and the communications bus is configured to build a connection between the processor and the memory.

According to a ninth aspect, a computer readable storage medium is provided. The computer readable storage medium stores an instruction, and the instruction, when run on a computer, causes the computer to perform the carrier power control method in the foregoing sixth aspect.

According to a tenth aspect, a computer program product including an instruction is provided. The instruction, when run on a computer, causes the computer to perform the carrier power control method in the foregoing sixth aspect.

Technical effects obtained by the seventh aspect, the eighth aspect, the ninth aspect and the tenth aspect are similar to a technical effect obtained by a corresponding technical means in the sixth aspect, and details are not described herein again.

A beneficial effect of the technical solutions provided by this application is as follows. First, the maximum transmit power of the common channels of the plurality of to-be-transmitted carriers is set based on the signal coverage of the network device, to ensure that the signal coverage of the network device is not narrowed. Then the maximum transmit power of traffic channels of the plurality of carriers is set based on the total signal transmit power of the network device and the maximum transmit power of the common channels of the plurality of carriers. For each scheduling period, the plurality of shared traffic powers of the scheduling period previous to the scheduling period are determined based on the maximum transmit power of the traffic channels of the plurality of carriers and the actual transmit power of the traffic channels of the plurality of carriers in the previous scheduling period, and the plurality of shared traffic powers of the previous scheduling period are set for the traffic channels of the plurality of carriers, to obtain the shared transmit power of the traffic channels of the plurality of carriers in the scheduling period. Subsequently, the plurality of carriers are transmitted in the scheduling period based on the maximum transmit power of the common channels of the plurality of carriers, the maximum transmit power of the traffic channels of the plurality of carriers, and the shared transmit power of the traffic channels of the plurality of carriers in the scheduling period, so that the traffic throughput of the traffic channels of the plurality of carriers is improved by sharing, without narrowing the signal coverage of the network device, the plurality of shared powers with the traffic channels of the plurality of carriers for use.

BRIEF DESCRIPTION OF DRAWINGS

Figure 2:
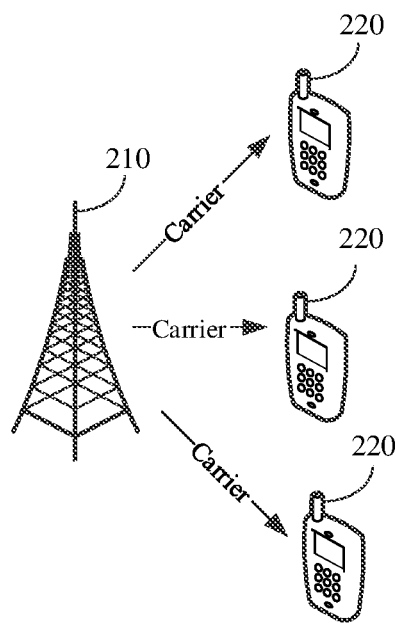
FIG. 2 is a schematic diagram of an implementation environment according to an embodiment of the present invention.
Figure 3:
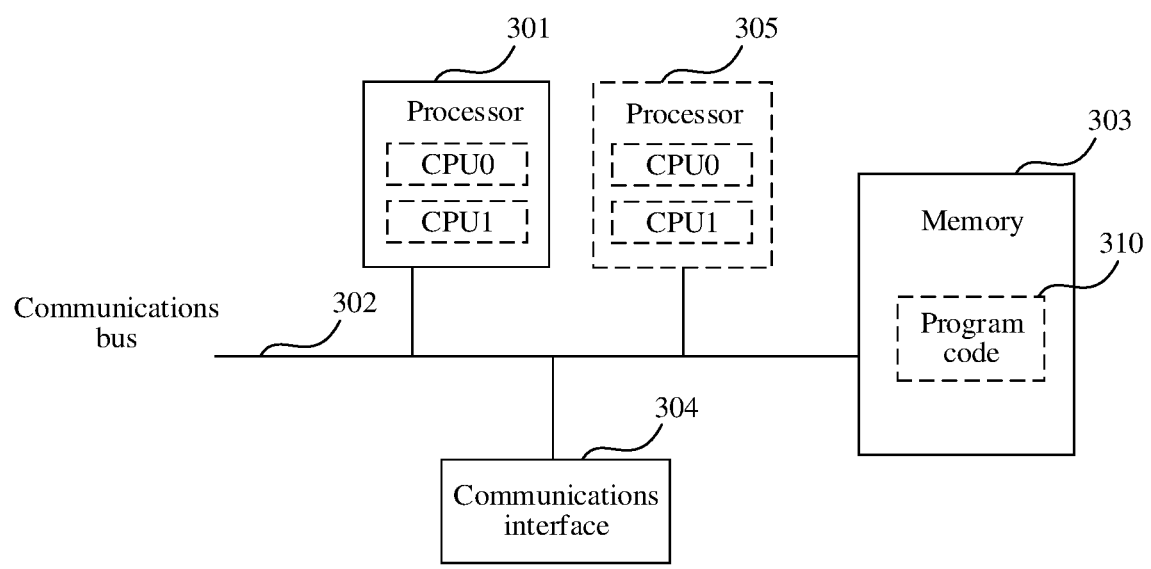
FIG. 3 is a schematic structural diagram of a network device according to an embodiment of the present invention.
Figure 4:
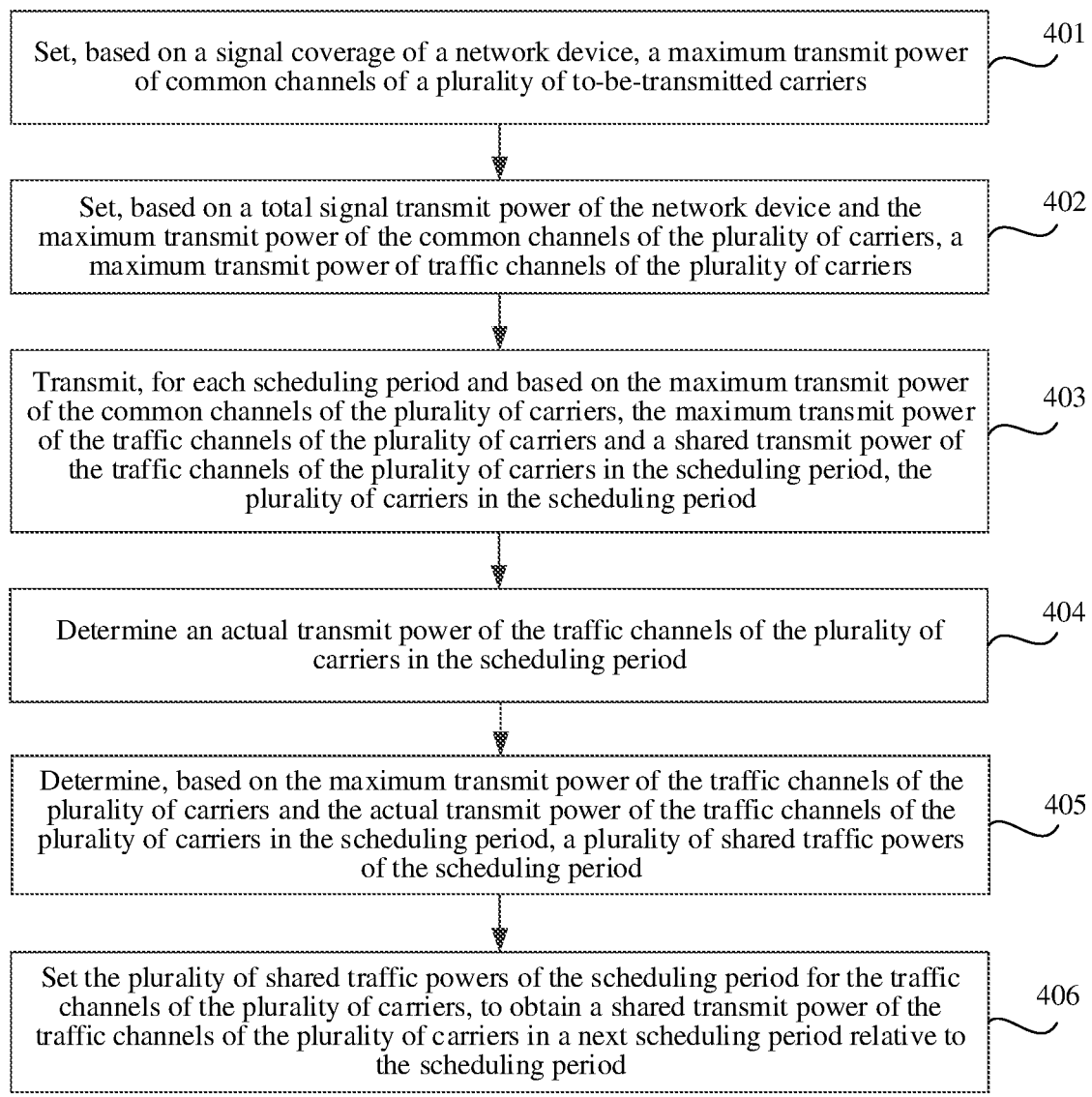
FIG. 4 is a flowchart of a carrier power control method according to an embodiment of the present invention.
Figure 5:
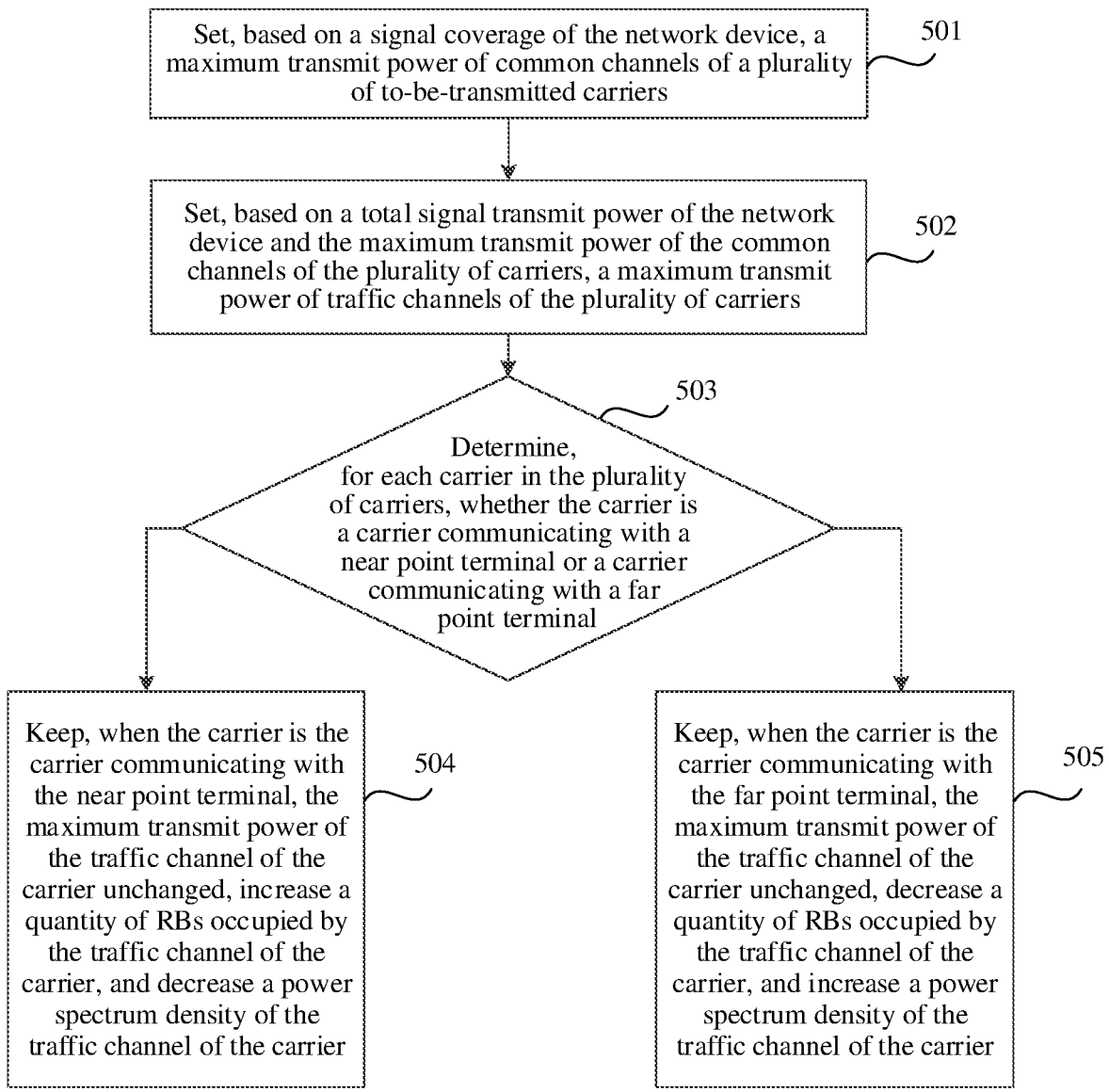
FIG. 5 is a flowchart of another carrier power control method according to an embodiment of the present invention.
Figure 6A:
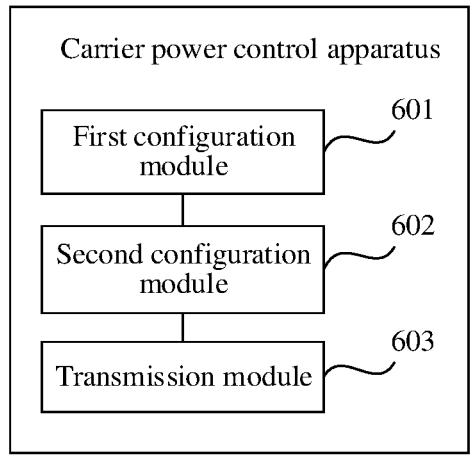
FIG. 6A is a schematic structural diagram of a first type of carrier power control apparatus according to an embodiment of the present invention.
Figure 6B:
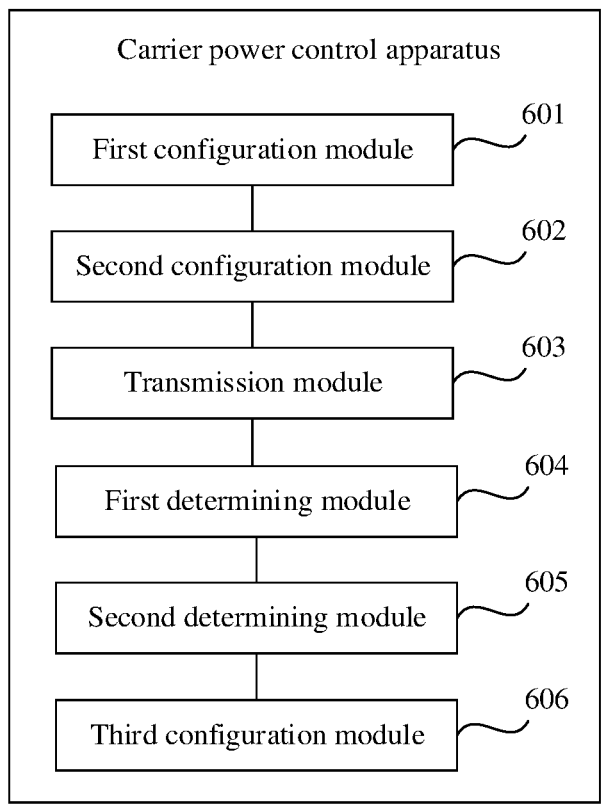
FIG. 6B is a schematic structural diagram of a second type of carrier power control apparatus according to an embodiment of the present invention.
Figure 6C:
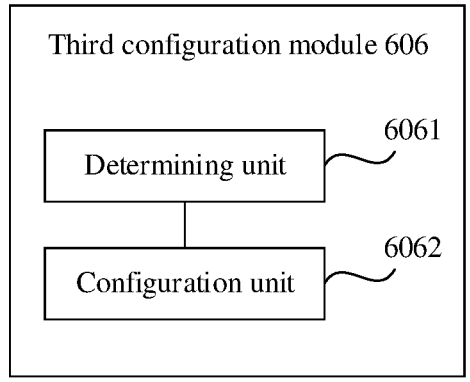
FIG. 6C is a schematic structural diagram of a third configuration module according to an embodiment of the present invention.
Figure 6D:
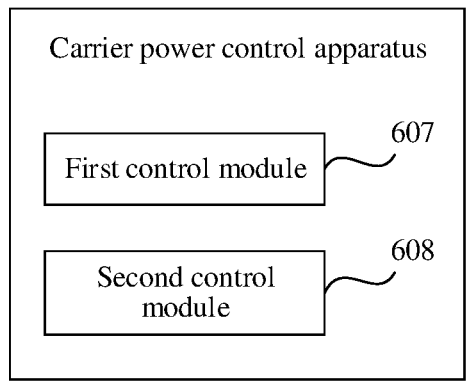
FIG. 6D is a schematic structural diagram of a third type of carrier power control apparatus according to an embodiment of the present invention.
Figure 7:
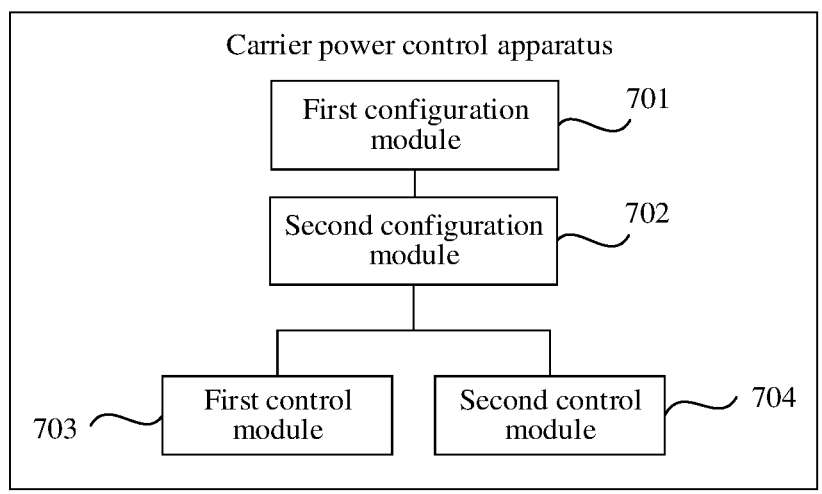
FIG. 7 is a schematic structural diagram of a fourth type of carrier power control apparatus according to an embodiment of the present invention.

FIG. 1 is a schematic diagram of a transmit power of a carrier in a related technology according to an embodiment of the present invention;

FIG. 2 is a schematic diagram of an implementation environment according to an embodiment of the present invention;

FIG. 3 is a schematic structural diagram of a network device according to an embodiment of the present invention;

FIG. 4 is a flowchart of a carrier power control method according to an embodiment of the present invention;

FIG. 5 is a flowchart of another carrier power control method according to an embodiment of the present invention;

FIG. 6A is a schematic structural diagram of a first type of carrier power control apparatus according to an embodiment of the present invention;

FIG. 6B is a schematic structural diagram of a second type of carrier power control apparatus according to an embodiment of the present invention;

FIG. 6C is a schematic structural diagram of a third configuration module according to an embodiment of the present invention;

FIG. 6D is a schematic structural diagram of a third type of carrier power control apparatus according to an embodiment of the present invention; and FIG. 7 is a schematic structural diagram of a fourth type of carrier power control apparatus according to an embodiment of the present invention.

DESCRIPTION OF EMBODIMENTS

To make the objectives, technical solutions, and advantages of this application clearer, the following further describes the implementations of this application in detail with reference to the accompanying drawings.

First, an application scenario in embodiments of the present invention is described.

To prevent electromagnetic pollution caused by excessively high electromagnetic radiation of a base station, the electromagnetic radiation of the base station is usually limited. Because the electromagnetic radiation of the base station is related to a transmit power of a carrier, that is, a higher transmit power of the carrier causes higher electromagnetic radiation, the base station usually limits the electromagnetic radiation of the base station by controlling a total transmit power of the carrier.

Currently, the base station usually decreases, based on a uniform ratio, the transmit power of the carrier that is set by the base station when the electromagnetic radiation is not limited, so that a total transmit power of a carrier of the base station is lower than a power limited by the electromagnetic radiation. However, when the transmit power of the carrier is decreased based on the uniform ratio, a transmit power of a common channel of the carrier and a transmit power of a traffic channel of the carrier are both decreased based on the uniform ratio. The decrease of the transmit power of the common channel of the carrier narrows the cell coverage of the base station. Consequently, the cell capacity is decreased. The decrease of the transmit power of the traffic channel of the carrier leads to a decrease of the cell traffic throughput of the base station. Therefore, an embodiment of the present invention provides a carrier power control method to improve the cell traffic throughput without narrowing the cell coverage.

Second, an implementation environment in this embodiment of the present invention is described.

FIG. 2 is a schematic diagram of an implementation environment according to an embodiment of the present invention. Referring to FIG. 2, the implementation environment may include: a network device 210 and a plurality of terminals 220. The network device 210 may communicate, by using a plurality of carriers, with the plurality of terminals 220 one by one, and the network device 210 may transmit common information to the plurality of terminals 220 through common channels of the plurality of carriers, and transmit traffic information to the plurality of terminals 220 through traffic channels of the plurality of carriers.

FIG. 3 is a schematic structural diagram of a network device according to an embodiment of the present invention. The network device may be the network device 210 shown in FIG. 2. Referring to FIG. 3, the network device includes at least one processor 301, a communications bus 302, a memory 303 and at least one communications interface 304.

The processor 301 may be a central processing unit (CPU), a microprocessor, an application-specific integrated circuit (ASIC), or one or more integrated circuits configured to control execution of a program of a solution of this application.

The communications bus 302 may include a channel configured to transmit information between the foregoing components.

The memory 303 may be a read-only memory (ROM) or another type of static storage device that can store static information and an instruction, a random access memory (RAM) or another type of dynamic storage device that can store information and an instruction, or may be an electrically erasable programmable read-only memory (EEPROM), a compact disc read-only memory (CD-ROM) or another optical disc storage, a disc storage (including a compact disc, a laser disc, an optical disc, a digital versatile disc, a Blu-ray disc, or the like), a magnetic disk storage medium or another magnetic disk storage device, or any other medium that can be used to carry or store expected program code in an instruction or data structure form and that can be accessed by a computer, but the present invention is not limited thereto. The memory 303 may exist independently, and is connected to the processor 301 by using the communications bus 302. Alternatively, the memory 303 may be integrated with the processor 301.

The communications interface 304 uses any apparatus of a transceiver type, to communicate with another device or a communications network, such as an Ethernet, a radio access network (RAN), or a wireless local area network (WLAN).

During specific implementation, as an embodiment, the processor 301 may include one or more CPUs, for example, the CPUo and the CPUi shown in FIG. 3.

During specific implementation, as an embodiment, the network device may include a plurality of processors, for example, the processor 301 and the processor 305 shown in FIG. 3. Each of these processors may be a single-core processor (single-CPU), or may be a multi-core processor (multi-CPU). The processor herein may be one or more devices, circuits, and/or processing cores configured to process data (for example, a computer program instruction).

The network device may be a common network device or a dedicated network device. During specific implementation, the network device may be a base station, a base station controller and the like, the embodiments of the present invention do not limit a type of the network device.

The memory 303 is configured to store program code 310 used to execute the solution of this application, and the processor 301 is configured to execute the program code 310 stored in the memory 303. The network device may implement, through the processor 301 and the program code 310 in the memory 303, the carrier power control method provided by the embodiment of FIG. 4 or the embodiment of FIG. 5 in the following.

FIG. 4 is a flowchart of a carrier power control method according to an embodiment of the present invention. The method is applied to a network device, and the network device may be the network device shown in FIG. 3. Referring to FIG. 4, the method includes the following steps.

Step 401: Set, based on a signal coverage of the network device, a maximum transmit power of common channels of a plurality of to-be-transmitted carriers.

It should be noted that the signal coverage of the network device is a coverage that the network device expects to reach when the network device transmits a signal, and the signal coverage of the network device may be pre-planned by the network device. For example, when the network device is a base station, the signal coverage of the network device may be a cell coverage of the base station.

In addition, the plurality of to-be-transmitted carriers are carriers used by the network device and the plurality of terminals when the network device communicates with the plurality of terminals, and the plurality of carriers may include carriers of different standards and/or different frequency bands. For example, the plurality of carriers may include carriers of different standards such as a long term evolution (LTE) carrier, a global system for mobile communications (GSM) carrier, a universal mobile telecommunications system (UMTS) carriers and the like, and/or carriers of different frequency bands such as a 1900 to 1920 megahertz (MHz) carrier, a 2010 to 2025 MHz carrier, a 1930 to 1990 MHz carrier and the like.

Specifically, a corresponding transmit power may be obtained based on the signal coverage of the network device from a stored correspondence between the signal coverage and the transmit power, and the obtained transmit power is determined as the maximum transmit power of the common channels of the plurality of carriers. Certainly, the maximum transmit power of the common channels of the plurality of carriers may alternatively be determined in another manner based on the signal coverage of the network device. This is not limited in this embodiment of the present invention.

For example, the signal coverage of the network device is 500 meters, then a corresponding transmit power may be obtained, that is, 0.5 watts (W), based on the signal coverage, that is, 500 meters, of the network device from a correspondence, shown in the following Table 1, between the signal coverage and the transmit power, and the obtained transmit power, that is, 0.5 W, is determined as the maximum transmit power of the common channels of the plurality of carriers.

TABLE 1

| Signal coverage | Transmit power |
| --- | --- |
| 0 to 500 meters | 0.5 W |
| 500 to 1000 meters | 1 W |
| 1000 to 1500 meters | 1.5 W |
| . . . | . . . |

It should be noted that, in this embodiment of the present invention, a correspondence between the signal coverage and the transmit power shown in Table 1 is merely used as an example for description, and Table 1 does not constitute a limitation to this embodiment of the present invention.

It should be noted that, after the maximum transmit power of the common channels of the plurality of carriers is set based on the signal coverage of the network device, the network device may transmit the common channels of the plurality of carriers at the maximum transmit power of the common channels of the plurality of carriers. In this case, a coverage of the common channels of the plurality of carriers can reach a signal coverage pre-planned by the network device, to ensure that the signal coverage of the network device is not narrowed.

Step 402: Set, based on a total signal transmit power of the network device and the maximum transmit power of the common channels of the plurality of carriers, a maximum transmit power of traffic channels of the plurality of carriers.

Because the carrier includes a common channel and a traffic channel, for ease of subsequent transmission of the plurality of carriers, after the maximum transmit power of the common channels of the plurality of carriers is set, the maximum transmit power of the traffic channels of the plurality of carriers may be set based on the maximum transmit power of the common channels of the plurality of carriers.

It should be noted that the total signal transmit power of the network device may be a maximum power that the network device can provide when the electromagnetic radiation is not limited by the network device, and may be a power limited by the electromagnetic radiation when the electromagnetic radiation is limited by the network device. That is, the total signal transmit power of the network device may be determined based on an electromagnetic radiation limitation requirement of the network device. This is not limited in this embodiment of the present invention.

Specifically, a total traffic transmit power may be obtained by subtracting the maximum transmit power of the common channels of the plurality of carriers from the total signal transmit power of the network device, and the total traffic transmit power is set for the traffic channels of the plurality of carriers, to obtain the maximum transmit power of the traffic channels of the plurality of carriers. Certainly, the maximum transmit power of traffic channels of the plurality of carriers may alternatively be set in another manner based on the total signal transmit power of the network device and the maximum transmit power of the common channels of the plurality of carriers. This is not limited in this embodiment of the present invention.

When the total traffic transmit power is set for the traffic channels of the plurality of carriers to obtain the maximum transmit power of the traffic channels of the plurality of carriers, the total traffic transmit power may be equally allocated to the traffic channels of the plurality of carriers to obtain the maximum transmit power of the traffic channels of the plurality of carriers. Alternatively, the total traffic transmit power may be allocated to the traffic channels of the plurality of carriers based on power configuration ratios of the traffic channels of the plurality of carriers to obtain the maximum transmit power of the traffic channels of the plurality of carriers. Certainly, the total traffic transmit power may alternatively be allocated to the traffic channels of the plurality of carriers in another manner to obtain the maximum transmit power of the traffic channels of the plurality of carriers. This is not limited in this embodiment of the present invention.

It should be noted that a power configuration ratio of a traffic channel is used to indicate a size of the transmit power required by the traffic channel. In other words, a higher power configuration ratio of the traffic channel indicates a larger demand on traffic performance of the traffic channel and a larger transmit power required by the traffic channel; and a lower power configuration ratio of the traffic channel indicates a smaller demand on traffic performance of the traffic channel and a smaller transmit power required by the traffic channel. The power configuration ratios of the traffic channels of the plurality of carriers may be preset. This is not limited in this embodiment of the present invention.

For example, the total traffic transmit power is 3 W, and the traffic channels of the plurality of carriers include a traffic channel 1 and a traffic channel 2. The total traffic transmit power, that is, 3 W, may be equally allocated to the traffic channels of the plurality of carriers, and obtained maximum transmit powers of the traffic channel 1 and the traffic channel 2 are both 1.5 W.

For another example, the total traffic transmit power is 3 W, the traffic channels of the plurality of carriers include a traffic channel 1 and a traffic channel 2, and power configuration ratios of the traffic channel 1 and the traffic channel 2 are respectively ⅔ and ⅓. The total traffic transmit power may be allocated to the traffic channels of the plurality of carriers based on the power configuration ratios of the traffic channels of the plurality of carriers, and obtained maximum transmit powers of the traffic channel 1 and the traffic channel 2 are respectively 2 W and 1 W.

Further, in a first scheduling period after the maximum transmit powers of the common channels and the traffic channels of the plurality of carriers are set in step 401 and step 402, the network device may transmit the plurality of carriers in the first scheduling period based on the maximum transmit powers of the common channels and the traffic channels of the plurality of carriers.

Specifically, for each common channel in the common channels of the plurality of carriers, the common channel may be transmitted at a maximum transmit power of the common channel; and for each traffic channel in the traffic channels of the plurality of carriers, a transmit power required by the traffic channel is determined based on a traffic data volume carried by the traffic channel. When the transmit power required by the traffic channel is less than a maximum transmit power of the traffic channel, the traffic channel is transmitted at the transmit power required by the traffic channel; and when the transmit power required by the traffic channel is not less than the maximum transmit power of the traffic channel, the traffic channel is transmitted at the maximum transmit power of the traffic channel. Certainly, the plurality of carriers may alternatively be transmitted in the first scheduling period in another manner based on the maximum transmit powers of the common channels and the traffic channels of the plurality of carriers, provided that the actual transmit powers of the common channels and the traffic channels of the plurality of carriers in the first scheduling period are not greater than the maximum transmit powers of the common channels and the traffic channels of the plurality of carriers in the first scheduling period.

When the transmit power required by the traffic channel is determined based on the traffic data volume carried by the traffic channel, a corresponding transmit power may be obtained based on the traffic data volume carried by the traffic channel from a stored correspondence between a traffic data volume and a transmit power, and the obtained transmit power is determined as the transmit power required by the traffic channel. Certainly, the transmit power required by the traffic channel may alternatively be determined in another manner based on the traffic data volume carried by the traffic channel. This is not limited in this embodiment of the present invention.

For example, the traffic data volume carried by the traffic channel is 50 bits. A corresponding transmit power may be obtained, that is, 0.1 W, based on the traffic data volume, that is, 50 bits, carried by the traffic channel, from a correspondence between a traffic data volume and a transmit power shown in the following Table 2, and the obtained transmit power, that is, 0.1 W, is determined as the transmit power required by the traffic channel.

TABLE 2

| Traffic data volume | Transmit power |
|---|---|
| 0 to 50 bits | 0.1 W |
| 50 to 100 bits | 0.2 W |
| 100 to 150 bits | 0.3 W |
| . . . | . . . |

It should be noted that, in this embodiment of the present invention, the correspondence between the traffic data volume and the transmit power shown in Table 2 is merely used as an example for description, and Table 2 does not constitute a limitation to this embodiment of the present invention.

Further, after the plurality of carriers are transmitted in the first scheduling period, a shared transmit power of the traffic channels of the plurality of carriers in a second scheduling period may further be determined, so that the plurality of carriers can be subsequently transmitted in the second scheduling period based on the shared transmit power of the traffic channels of the plurality of carriers in the second scheduling period. Specifically, an actual transmit power of the traffic channels of the plurality of carriers in the first scheduling period may be determined; a plurality of shared traffic powers of the first scheduling period are determined based on the maximum transmit power of the traffic channels of the plurality of carriers and the actual transmit power of the traffic channels of the plurality of carriers in the first scheduling period; and the plurality of shared traffic powers of the first scheduling period are set for the traffic channels of the plurality of carriers to obtain shared transmit power of the traffic channels of the plurality of carriers in the second scheduling period.

For each carrier in the plurality of carriers, a power obtained by subtracting an actual transmit power of the traffic channel of the carrier in the first scheduling period from the maximum transmit power of the traffic channel of the carrier may be determined as a shared traffic power in the first scheduling period. Alternatively, when a power obtained by subtracting an actual transmit power of the traffic channel of the carrier in the first scheduling period from the maximum transmit power of the traffic channel of the carrier is greater than a preset power, the obtained power may be determined as a shared traffic power in the first scheduling period.

It should be noted that the preset power may be preset. For example, the preset power may be 0.1 W, 0.2 W or the like.

In addition, a power obtained by subtracting an actual transmit power of the traffic channel of the carrier in the first scheduling period from the maximum transmit power of the traffic channel of the carrier is determined as a shared traffic power in the first scheduling period. That is, all powers that are set for the traffic channel of the carrier but that are not used by the traffic channel of the carrier in the first scheduling period are determined as a shared traffic power in the first scheduling period. When the power obtained by subtracting the actual transmit power of the traffic channel of the carrier in the first scheduling period from the maximum transmit power of the traffic channel of the carrier is greater than the preset power, the obtained power is determined as the shared traffic power in the first scheduling period. Namely, only when there is a relatively large difference between an actual power used by the traffic channel of the carrier in the first scheduling period and a power set for the traffic channel of the carrier, all powers that are not used by the traffic channel of the carrier in the first scheduling period are determined as the shared traffic power of the first scheduling period, to ensure that normal transmission of the traffic channel of the carrier is not affected when the shared traffic power is subsequently shared with a traffic channel of another carrier.

When the plurality of shared traffic powers in the first scheduling period are set for the traffic channels of the plurality of carriers to obtain the shared transmit power of the traffic channels of the plurality of carriers in the second scheduling period, a plurality of target traffic channels may be determined in the traffic channels of the plurality of carriers, and the plurality of shared traffic powers in the first scheduling period are set for the plurality of target traffic channels to obtain a shared transmit power of the plurality of target traffic channels in the second scheduling period. Certainly, the plurality of shared traffic transmit powers in the first scheduling period may alternatively be set for the traffic channels of the plurality of carriers in another manner to obtain the shared transmit power of the traffic channels of the plurality of carriers in the second scheduling period. This is not limited in this embodiment of the present invention.

It should be noted that, setting the plurality of shared traffic transmit powers in the first scheduling period for the traffic channels of the plurality of carriers is sharing the plurality of shared traffic transmit powers in the first scheduling period with the traffic channels of the plurality of carriers for use. In this case, the shared transmit power of each traffic channel includes a maximum transmit power and a shared traffic power of each traffic channel.

In addition, a target traffic channel may be a channel whose traffic performance needs to be improved, namely, a channel with relatively low traffic performance. For example, the target traffic channel may be a channel with a modulation order lower than a preset order, a channel carrying a traffic data volume greater than a preset data volume, a channel with a quantity of traffic data retransmission times greater than a preset quantity of times, a channel with a signal-to-noise ratio lower than a preset ratio, or the like. This is not limited in this embodiment of the present invention.

Further, the preset order, the preset data volume, the preset quantity of times and the preset ratio may all be preset. This is not limited in this embodiment of the present invention.

When the plurality of shared traffic powers in the first scheduling period are set for the plurality of target traffic channels, the plurality of shared traffic powers in the first scheduling period may be equally allocated to the plurality of target traffic channels. Alternatively, the plurality of shared traffic powers in the first scheduling period may be set for the plurality of target traffic channels based on power configuration ratios of the plurality of target traffic channels. Certainly, the plurality of shared traffic transmit powers in the first scheduling period may alternatively be set for the plurality of target traffic channels in another manner. This is not limited in this embodiment of the present invention.

It should be noted that, after the shared transmit power of the traffic channels of the plurality of carriers in the second scheduling period is obtained through the foregoing operation, power control and transmission may be performed on the plurality of carriers in each scheduling period after the first scheduling period based on the following step 403 to step 406.

Step 403: Transmit, for each scheduling period and based on the maximum transmit power of the common channels of the plurality of carriers, the maximum transmit power of the traffic channels of the plurality of carriers and a shared transmit power of the traffic channels of the plurality of carriers in the scheduling period, the plurality of carriers in the scheduling period.

Specifically, for each common channel in the common channels of the plurality of carriers, the common channel is transmitted at the maximum transmit power of the common channel; and for each traffic channel in the traffic channels of the plurality of carriers, the transmit power required by the traffic channel is determined based on a traffic data volume carried by the traffic channel. When the transmit power required by the traffic channel is less than the maximum transmit power of the traffic channel, the traffic channel is transmitted at the transmit power required by the traffic channel; and when the transmit power required by the traffic channel is not less than the maximum transmit power of the traffic channel and less than the shared transmit power of the traffic channel in the scheduling period, if the shared traffic power included in the shared transmit power of the traffic channel in the scheduling period is not used, the traffic channel is transmitted at the transmit power required by the traffic channel, and if the shared traffic power included in the shared transmit power of the traffic channel in the scheduling period is used, the traffic channel is transmitted at the maximum transmit power of the traffic channel; and when the transmit power required by the traffic channel is not less than the shared transmit power of the traffic channel in the scheduling period, if the shared traffic power included in the shared transmit power of the traffic channel in the scheduling period is not used, the traffic channel is transmitted at the shared transmit power of the traffic channel in the scheduling period, and if the shared traffic power included in the shared transmit power of the traffic channel in the scheduling period is used, the traffic channel is transmitted at the maximum transmit power of the traffic channel. Certainly, the plurality of carriers may alternatively be transmitted in the scheduling period in another manner based on the maximum transmit power of the common channels of the plurality of carriers, the maximum transmit power of the traffic channels of the plurality of carriers and the shared transmit power of the traffic channels of the plurality of carriers in the scheduling period, provided that the actual transmit power of the common channels of the plurality of carriers in the scheduling period is not greater than the maximum transmit power of the common channels of the plurality of carriers in the scheduling period, and the actual transmit power of the traffic channels of the plurality of carriers in the scheduling period is not greater than the maximum transmit power of the traffic channels of the plurality of carriers or the shared transmit power of the traffic channels of the plurality of carriers in the scheduling period.

An operation of determining, based on the traffic data volume carried by the traffic channel, the transmit power required by the traffic channel is the same as an operation, in step 402, of determining, based on the traffic data volume carried by the traffic channel, the transmit power required by the traffic channel, and this is not described in detail again in this embodiment of the present invention.

Step 404: Determine an actual transmit power of the traffic channels of the plurality of carriers in the scheduling period.

Step 405: Determine, based on the maximum transmit power of the traffic channels of the plurality of carriers and the actual transmit power of the traffic channels of the plurality of carriers in the scheduling period, a plurality of shared traffic powers of the scheduling period. Specifically, step 405 is similar to an operation, in step 402, in which the plurality of shared traffic powers of the first scheduling period are determined based on the maximum transmit power of the traffic channels of the plurality of carriers and the actual transmit power of the traffic channels of the plurality of carriers in the first scheduling period, and this is not described in detail again in this embodiment of the present invention.

Step 406: Set the plurality of shared traffic powers of the scheduling period for the traffic channels of the plurality of carriers, to obtain a shared transmit power of the traffic channels of the plurality of carriers in a next scheduling period relative to the scheduling period.

Specifically, step 406 is similar to an operation, in step 402, in which the plurality of shared traffic powers in the first scheduling period are set for the traffic channels of the plurality of carriers in another manner to obtain the shared transmit power of the traffic channels of the plurality of carriers in the second scheduling period, and this is not described in detail again in this embodiment of the present invention.

It should be noted that in this embodiment of the present invention, when the total signal transmit power keeps unchanged, a traffic throughput of the traffic channels of the plurality of carriers is improved by sharing a plurality of shared powers with the traffic channels of the plurality of carriers for use, without reducing the maximum transmit power of the common channels of the plurality of carriers, that is, without narrowing the signal coverage of the network device.

It should be noted that, in this embodiment of the present invention, not only the plurality of shared traffic powers can be shared with the traffic channels of the plurality of carriers for use, but a quantity of RBs and a power spectrum density of the traffic channel of each carrier in the plurality of carriers can be separately adjusted to improve a traffic throughput of the traffic channel of each carrier in the plurality of carriers. Specifically, for each carrier in the plurality of carriers, when the carrier is a carrier communicating with a near point terminal, a maximum transmit power of the traffic channel of the carrier is kept unchanged, a quantity of RBs occupied by the traffic channel of the carrier is increased, and a power spectrum density of the traffic channel of the carrier is decreased; and when the carrier is a carrier communicating with a far point terminal, the maximum transmit power of the traffic channel of the carrier is kept unchanged, the quantity of the RBs occupied by the traffic channel of the carrier is decreased, and the power spectrum density of the traffic channel of the carrier is increased.

It should be noted that a distance between the near point terminal and the network device is less than a preset distance, and a distance between the far point terminal and the network device is not less than the preset distance. That is, the near point terminal is a terminal relatively close to the network device, and the far point terminal is a terminal relatively far from the network device.

In addition, the preset distance may be preset. For example, the preset distance may be 200 meters, 250 meters or the like.

A bandwidth of the near point terminal is usually limited. Therefore, a transmission rate that can be improved by increasing the quantity of RBs occupied by the traffic channel of the carrier communicating with the near point terminal, that is, by increasing an available bandwidth of the near point terminal is greater than a transmission rate that is decreased by decreasing a power spectrum density of the traffic channel of the carrier, so that a transmission rate of the traffic channel of the carrier is increased, thereby improving a traffic throughput of the traffic channel of the carrier. A power of the far point terminal is usually limited. Therefore, a transmission rate that can be improved by increasing the power spectrum density of the traffic channel of the carrier communicating with the far point terminal, that is, by increasing an available power of the far point terminal is greater than a transmission rate that is decreased by decreasing the quantity of RBs occupied by the traffic channel of the carrier, so that a transmission rate of the traffic channel of the carrier is increased, thereby improving a traffic throughput of the traffic channel of the carrier. In other words, in this embodiment of the present invention, by dynamically adjusting a power resource and a spectrum resource, the traffic throughput of the traffic channel of the carrier may be improved when the maximum transmit power of the traffic channel of the carrier keeps unchanged.

The maximum transmit power of the traffic channel of the carrier is kept unchanged, and the quantity of RBs occupied by the traffic channel of the carrier is increased, and the power spectrum density of the traffic channel of the carrier is decreased. In this way, a maximum quantity of RBs that can be occupied by the carrier may be determined, and the quantity of RBs occupied by the carrier is increased to the maximum quantity of RBs. Subsequently, the maximum transmit power of the traffic channel of the carrier is divided by a bandwidth corresponding to the quantity of RBs occupied by the traffic channel, to obtain a power spectrum density of the traffic channel of the carrier, thereby decreasing the power spectrum density of the traffic channel of the carrier. Certainly, when the maximum transmit power of the traffic channel of the carrier is kept unchanged, the quantity of RBs occupied by the traffic channel of the carrier and the power spectrum density of the traffic channel of the carrier may further be respectively increased and decreased in another manner, and this is not limited in this embodiment of the present invention.

When a maximum quantity of RBs that can be occupied by the carrier is determined, based on a standard of the carrier, a corresponding maximum quantity of RBs may be obtained from a stored correspondence between a standard and a maximum quantity of RBs, and the obtained maximum quantity of RBs is determined as the maximum quantity of RBs that can be occupied by the carrier. Certainly, the maximum quantity of RBs occupied by the carrier may alternatively be determined in another manner, and this is not limited in this embodiment of the present invention.

For example, a standard of the carrier is LTE. Based on the standard LTE of the carrier, a maximum quantity of RBs may be obtained as 100 from a correspondence between a standard and a maximum quantity of RBs shown in the following Table 3, and the obtained maximum quantity, that is, 100, of RBs is determined as the maximum quantity of RBs that can be occupied by the carrier.

TABLE 3

| Standard | Maximum quantity of RBs |
|---|---|
| LTE | 100 |
| GSM | 75 |
| UMTS | 80 |
| ... | ... |

It should be noted that, in this embodiment of the present invention, a correspondence between the standard and the maximum quantity of RBs shown in Table 3 is merely used as an example for description, and Table 3 does not constitute a limitation to this embodiment of the present invention.

The maximum transmit power of the traffic channel of the carrier is kept unchanged, and the quantity of RBs occupied by the traffic channel of the carrier is decreased, and the power spectrum density of the traffic channel of the carrier is increased. In this case, a minimum quantity of RBs that the traffic channel of the carrier needs to occupy may be determined, and the quantity of RBs occupied by the carrier is decreased to the minimum quantity of RBs. Subsequently, the maximum transmit power of the traffic channel of the carrier is divided by a bandwidth corresponding to the quantity of RBs occupied by the traffic channel, to obtain a power spectrum density of the traffic channel of the carrier, to increase the power spectrum density of the traffic channel of the carrier. Certainly, when the maximum transmit power of the traffic channel of the carrier is kept unchanged, the quantity of RBs occupied by the traffic channel of the carrier and the power spectrum density of the traffic channel of the carrier may further be respectively decreased and increased in another manner, and this is not limited in this embodiment of the present invention.

When a minimum quantity of RBs that the carrier needs to occupy is determined, based on a standard of the carrier, a corresponding minimum quantity of RBs may be obtained from a stored correspondence between a standard and a minimum quantity of RBs, and the obtained minimum quantity of RBs is determined as the minimum quantity of RBs that the carrier needs to occupy. Certainly, the minimum quantity of RBs that the carrier needs to occupy may alternatively be determined in another manner, and this is not limited in this embodiment of the present invention.

For example, a standard of the carrier is LTE. Based on the system LTE of the carrier, a corresponding minimum quantity of RBs may be obtained as 50 from a correspondence between a standard and a minimum quantity of RBs shown in Table 4, and the obtained minimum quantity, that is, 50, of RBs is determined as the minimum quantity of RBs that the carrier needs to occupy.

TABLE 4

| Standard | Minimum quantity of RBs |
|---|---|
| LTE | 50 |
| GSM | 32 |
| UMTS | 40 |
| ... | ... |

It should be noted that, in this embodiment of the present invention, a correspondence between the standard and the minimum quantity of RBs shown in Table 4 is merely used as an example for description, and Table 4 does not constitute a limitation to this embodiment of the present invention.

In this embodiment of the present invention, first, the maximum transmit power of the common channels of the plurality of to-be-transmitted carriers is set based on the signal coverage of the network device, to ensure that the signal coverage of the network device is not narrowed. Then a maximum transmit power of traffic channels of the plurality of carriers is set based on a total signal transmit power of the network device and the maximum transmit power of the common channels of the plurality of carriers. For each scheduling period, a plurality of shared traffic powers of a scheduling period previous to the scheduling period are determined based on the maximum transmit power of the traffic channels of the plurality of carriers and the actual transmit power of the traffic channels of the plurality of carriers in the previous scheduling period, and the plurality of shared traffic powers of the previous scheduling period are set for the traffic channels of the plurality of carriers to obtain a shared transmit power of the traffic channels of the plurality of carriers in the scheduling period. Subsequently, the plurality of carriers are transmitted in the scheduling period based on the maximum transmit power of the common channels of the plurality of carriers, the maximum transmit power of the traffic channels of the plurality of carriers, and the shared transmit power of the traffic channels of the plurality of carriers in the scheduling period, so that a traffic throughput of the traffic channels of the plurality of carriers is improved by sharing, without narrowing the signal coverage of the network device, a plurality of shared powers with the traffic channels of the plurality of carriers for use.

FIG. 5 is a flowchart of a carrier power control method according to an embodiment of the present invention. The method is applied to a network device, and the network device may be the network device shown in FIG. 3. Referring to FIG. 5, the method includes the following steps.

Step 501: Set, based on a signal coverage of the network device, a maximum transmit power of common channels of a plurality of to-be-transmitted carriers.

Specifically, an operation of step 501 is the same as that of step 401, and this is not described in detail again in this embodiment of the present invention.

Step 502: Set, based on a total signal transmit power of the network device and the maximum transmit power of the common channels of the plurality of carriers, a maximum transmit power of traffic channels of the plurality of carriers.

Specifically, an operation of step 502 is the same as that of step 402, and this is not described in detail again in this embodiment of the present invention.

Step 503: Determine, for each carrier in the plurality of carriers, whether the carrier is a carrier communicating with a near point terminal or a carrier communicating with a far point terminal.

It should be noted that a distance between the near point terminal and the network device is less than a preset distance, and a distance between the far point terminal and the network device is not less than the preset distance. That is, the near point terminal is a terminal relatively close to the network device, and the far point terminal is a terminal relatively far from the network device.

In addition, the preset distance may be preset. For example, the preset distance may be 200 meters, 250 meters or the like.

Step 504: Keep, when the carrier is the carrier communicating with the near point terminal, the maximum transmit power of the traffic channel of the carrier unchanged, increase a quantity of RBs occupied by the traffic channel of the carrier, and decrease a power spectrum density of the traffic channel of the carrier.

A bandwidth of the near point terminal is usually limited. Therefore, a transmission rate that can be improved by increasing the quantity of RBs occupied by the traffic channel of the carrier communicating with the near point terminal, that is, by increasing an available bandwidth of the near point terminal is greater than a transmission rate that is decreased by decreasing a power spectrum density of the traffic channel, so that a transmission rate of the traffic channel of the carrier is increased, thereby improving a traffic throughput of the traffic channel of the carrier.

Specifically, step 504 is the same as an operation, in step 406, in which the maximum transmit power of the traffic channel of the carrier is kept unchanged when the carrier is the carrier communicating with the near point terminal, a quantity of RBs occupied by the traffic channel of the carrier is increased, and a power spectrum density of the traffic channel of the carrier is decreased, and this is not described in detail again in this embodiment of the present invention.

Step 505: Keep, when the carrier is the carrier communicating with the far point terminal, the maximum transmit power of the traffic channel of the carrier unchanged, decrease a quantity of RBs occupied by the traffic channel of the carrier, and increase a power spectrum density of the traffic channel of the carrier.

A power of the far point terminal is usually limited. Therefore, a transmission rate that can be improved by increasing the power spectrum density of the traffic channel of the carrier communicating with the far point terminal, that is, by increasing an available power of the far point terminal is greater than a transmission rate that is decreased by decreasing the quantity of RBs occupied by the traffic channel of the carrier, so that a transmission rate of the traffic channel of the carrier is increased, thereby improving a traffic throughput of the traffic channel of the carrier.

Specifically, step 505 is the same as an operation, in step 406, in which the maximum transmit power of the traffic channel of the carrier is kept unchanged when the carrier is the carrier communicating with the far point terminal, a quantity of RBs occupied by the traffic channel of the carrier is decreased, and a power spectrum density of the traffic channel of the carrier is increased, and this is not described in detail again in this embodiment of the present invention.

In this embodiment of the present invention, first, the maximum transmit power of the common channels of the plurality of to-be-transmitted carriers is set based on the signal coverage of the network device, to ensure that the signal coverage of the network device is not narrowed. Then a maximum transmit power of traffic channels of the plurality of carriers is set based on a total signal transmit power of the network device and the maximum transmit power of the common channels of the plurality of carriers. Subsequently, for each carrier in the plurality of carriers, when the carrier is a carrier communicating with a near point terminal, a maximum transmit power of the traffic channel of the carrier is kept unchanged, a quantity of RBs occupied by the traffic channel of the carrier is increased, and a power spectrum density of the traffic channel of the carrier is decreased; and when the carrier is a carrier communicating with a far point terminal, the maximum transmit power of the traffic channel of the carrier is kept unchanged, the quantity of the RBs occupied by the traffic channel of the carrier is decreased, and the power spectrum density of the traffic channel of the carrier is increased, so that the traffic throughput of the traffic channel of the carrier is improved, without narrowing the signal coverage of the network device, by dynamically adjusting a power resource and a spectrum resource when the maximum transmit power of the traffic channel of the carrier keeps unchanged.

FIG. 6A is a schematic structural diagram of a carrier power control apparatus according to an embodiment of the present invention. The carrier power control apparatus is applied to a network device, and may be a part or all of the network device by using software, hardware or a combination thereof. The network device may be the network device shown in FIG. 3. The carrier power control apparatus may be presented in a form of function modules. In this case, the function modules in the carrier power control apparatus may be implemented by the processor and the memory shown in FIG. 3. The processor can perform or control other components to complete steps in the method procedure of the embodiments of the present invention, to implement all functions.

Referring to FIG. 6A, the apparatus includes a first configuration module 601, a second configuration module 602 and a transmission module 603.

The first configuration module 601 is configured to perform step 401 in the embodiment of FIG. 4.

The second configuration module 602 is configured to perform step 402 in the embodiment of FIG. 4.

The transmission module 603 is configured to perform step 403 in the embodiment of FIG. 4.

The shared transmit power of the traffic channels of the plurality of carriers in the scheduling period is obtained after setting a plurality of shared traffic powers of a scheduling period previous to the scheduling period for the traffic channels of the plurality of carriers, and the plurality of shared traffic powers of the previous scheduling period are obtained through determining based on the maximum transmit power of the traffic channels of the plurality of carriers and an actual transmit power of the traffic channels of the plurality of carriers in the previous scheduling period.

Optionally, referring to FIG. 6B, the apparatus further includes a first determining module 604, a second determining module 605 and a third configuration module 606.

The first determining module 604 is configured to perform step 404 in the embodiment of FIG. 4.

The second determining module 605 is configured to perform step 405 in the embodiment of FIG. 4.

The third configuration module 606 is configured to perform step 406 in the embodiment of FIG. 4.

Optionally, the second determining module 605 is configured to: determine, for each carrier in the plurality of carriers, when a power obtained by subtracting an actual transmit power of a traffic channel of the carrier from a maximum transmit power of the traffic channel of the carrier is greater than a preset power, the obtained power as a shared traffic power.

Optionally, referring to FIG. 6C, the third configuration module 606 includes a determining unit 6061 and a configuration unit 6062.

The determining unit 6061 is configured to determine a plurality of target traffic channels in the traffic channels of the plurality of carriers, where the plurality of target traffic channels are channels whose traffic performance needs to be improved.

The configuration unit 6062 is configured to set the plurality of shared traffic powers of the scheduling period for the plurality of target traffic channels, to obtain a shared transmit power of the plurality of target traffic channels in a next scheduling period relative to the scheduling period.

Optionally, referring to FIG. 6D, the apparatus further includes a first control module 607 and a second control module 608.

The first control module 606 is configured to keep, for each carrier in the plurality of carriers, when the carrier is a carrier communicating with a near point terminal, the maximum transmit power of the traffic channel of the carrier unchanged, increase a quantity of resource blocks (RBs) occupied by the traffic channel of the carrier, and decrease a power spectrum density of the traffic channel of the carrier, where a distance between the near point terminal and the network device is less than a preset distance.

The second control module 607 is configured to keep, when the carrier is a carrier communicating with a far point terminal, the maximum transmit power of the traffic channel of the carrier unchanged, decrease the quantity of the RBs occupied by the traffic channel of the carrier, and increase the power spectrum density of the traffic channel of the carrier, where a distance between the far point terminal and the network device is not less than the preset distance.

Optionally, the plurality of carriers includes carriers of different standards and/or different frequency bands.

In the embodiments of the present invention, first, the maximum transmit power of the common channels of the plurality of to-be-transmitted carriers is set based on the signal coverage of the network device, to ensure that the signal coverage of the network device is not narrowed. Then a maximum transmit power of traffic channels of the plurality of carriers is set based on a total signal transmit power of the network device and the maximum transmit power of the common channels of the plurality of carriers. For each scheduling period, a plurality of shared traffic powers of a scheduling period previous to the scheduling period are determined based on the maximum transmit power of the traffic channels of the plurality of carriers and the actual transmit power of the traffic channels of the plurality of carriers in the previous scheduling period, and the plurality of shared traffic powers of the previous scheduling period are set for the traffic channels of the plurality of carriers to obtain a shared transmit power of the traffic channels of the plurality of carriers in the scheduling period. Subsequently, the plurality of carriers are transmitted in the scheduling period based on the maximum transmit power of the common channels of the plurality of carriers, the maximum transmit power of the traffic channels of the plurality of carriers, and the shared transmit power of the traffic channels of the plurality of carriers in the scheduling period, so that a traffic throughput of the traffic channels of the plurality of carriers is improved by sharing, without narrowing the signal coverage of the network device, a plurality of shared powers with the traffic channels of the plurality of carriers for use.

FIG. 7 is a schematic structural diagram of a carrier power control apparatus according to an embodiment of the present invention. The carrier power control apparatus is applied to a network device, and may be a part or all of the network device by using software, hardware or a combination thereof. The network device may be the network device shown in FIG. 3. The carrier power control apparatus may be presented in a form of function modules. In this case, the function modules in the carrier power control apparatus may be implemented by the processor and the memory shown in FIG. 3. The processor can perform or control other components to complete steps in the method procedure of the embodiments of the present invention, to implement all functions.

Referring to FIG. 7, the apparatus includes a first configuration module 701, a second configuration module 702, a first control module 703 and a second control module 704.

The first configuration module 701 is configured to perform step 501 in the embodiment of FIG. 5.

The second configuration module 702 is configured to perform step 502 in the embodiment of FIG. 5.

The first control module 703 is configured to perform step 504 in the embodiment of FIG. 5.

The second control module 704 is configured to perform step 505 in the embodiment of FIG. 5.

In the embodiments of the present invention, first, the maximum transmit power of the common channels of the plurality of to-be-transmitted carriers is set based on the signal coverage of the network device, to ensure that the signal coverage of the network device is not narrowed. Then a maximum transmit power of traffic channels of the plurality of carriers is set based on a total signal transmit power of the network device and the maximum transmit power of the common channels of the plurality of carriers. Subsequently, for each carrier in the plurality of carriers, when the carrier is a carrier communicating with a near point terminal, a maximum transmit power of the traffic channel of the carrier is kept unchanged, a quantity of RBs occupied by the traffic channel of the carrier is increased, and a power spectrum density of the traffic channel of the carrier is decreased; and when the carrier is a carrier communicating with a far point terminal, the maximum transmit power of the traffic channel of the carrier is kept unchanged, the quantity of the RBs occupied by the traffic channel of the carrier is decreased, and the power spectrum density of the traffic channel of the carrier is increased, so that the traffic throughput of the traffic channel of the carrier is improved, without narrowing the signal coverage of the network device, by dynamically adjusting a power resource and a spectrum resource when the maximum transmit power of the traffic channel of the carrier keeps unchanged.

It should be noted that, when the carrier power control apparatus provided in the foregoing embodiments controls carrier powers, a division of the foregoing function modules is merely used as an example for description. In actual application, the foregoing functions may be allocated, as required, to different function modules to implement. That is, an internal structure of the apparatus is divided into different function modules to implement all or some of the functions described above. In addition, the carrier power control apparatus provided by the foregoing embodiments has a same conception as that of the carrier power control method embodiment. For a specific implementation procedure, refer to the method embodiment, and it is not described herein again.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely embodiments of this application, but are not intended to limit this application. Any modification, equivalent replacement, or improvement made without departing from the spirit and principle of this application should fall within the protection scope of this application.

What is claimed is:
1. A method, comprising:
setting, by a network device based on a signal coverage of the network device, a maximum transmit power of common channels of a plurality of carriers;
setting, by the network device based on a total signal transmit power of the network device and the maximum transmit power of the common channels of the plurality of carriers, a maximum transmit power of traffic channels of the plurality of carriers; and
transmitting, by the network device for each scheduling period of a plurality of scheduling periods, the plurality of carriers in the respective scheduling period, wherein the plurality of carriers in the respective scheduling period are transmitted based on the maximum transmit power of the common channels of the plurality of carriers, the maximum transmit power of the traffic channels of the plurality of carriers, and a shared transmit power of the traffic channels of the plurality of carriers in the respective scheduling period;
wherein the shared transmit power of the traffic channels of the plurality of carriers in the respective scheduling period is obtained after setting a plurality of shared traffic powers of a scheduling period previous to the respective scheduling period for the traffic channels of the plurality of carriers, and the plurality of shared traffic powers of the previous scheduling period are determined based on the maximum transmit power of the traffic channels of the plurality of carriers and an actual transmit power of the traffic channels of the plurality of carriers in the previous scheduling period.

2. The method according to claim 1, wherein after transmitting the plurality of carriers in a first scheduling period of the plurality of scheduling periods, the method further comprises:
determining an actual transmit power of the traffic channels of the plurality of carriers in the first scheduling period;
determining, based on the maximum transmit power of the traffic channels of the plurality of carriers and the actual transmit power of the traffic channels of the plurality of carriers in the first scheduling period, a plurality of shared traffic powers of the first scheduling period; and
setting the plurality of shared traffic powers of the first scheduling period for the traffic channels of the plurality of carriers, to obtain a shared transmit power of the traffic channels of the plurality of carriers in a next scheduling period relative to the first scheduling period.

3. The method according to claim 2, wherein determining, based on the maximum transmit power of the traffic channels of the plurality of carriers and the actual transmit power of the traffic channels of the plurality of carriers in the first scheduling period, the plurality of shared traffic powers of the first scheduling period comprises:
determining, for each carrier in the plurality of carriers, whether a power obtained by subtracting an actual transmit power of a traffic channel of the respective carrier in the first scheduling period from a maximum transmit power of the traffic channel of the respective carrier is greater than a preset power, and in response to determining that the power obtained by subtracting the actual transmit power of the traffic channel of the respective carrier in the first scheduling period from the maximum transmit power of the traffic channel of the respective carrier is greater than the preset power, using the power as a shared traffic power of the first scheduling period.

4. The method according to claim 2, wherein setting the plurality of shared traffic powers of the first scheduling period for the traffic channels of the plurality of carriers, to obtain the shared transmit power of the traffic channels of the plurality of carriers in the next scheduling period relative to the first scheduling period comprises:
  determining a plurality of target traffic channels in the traffic channels of the plurality of carriers, wherein the plurality of target traffic channels are channels whose traffic performance needs to be improved; and
  setting the plurality of shared traffic powers of the first scheduling period for the plurality of target traffic channels, to obtain a shared transmit power of the plurality of target traffic channels in a next scheduling period relative to the first scheduling period.

5. The method according to claim 1, further comprising:
  keeping, for each carrier in the plurality of carriers, when the respective carrier is communicating with a near point terminal, the maximum transmit power of the traffic channel of the respective carrier unchanged, increasing a quantity of resource blocks (RBs) occupied by the traffic channel of the respective carrier, and decreasing a power spectrum density of the traffic channel of the respective carrier, wherein a distance between the near point terminal and the network device is less than a preset distance; and
  keeping, for each carrier in the plurality of carriers, when the respective carrier is communicating with a far point terminal, the maximum transmit power of the traffic channel of the respective carrier unchanged, decreasing the quantity of the RBs occupied by the traffic channel of the respective carrier, and increasing the power spectrum density of the traffic channel of the respective carrier, wherein a distance between the far point terminal and the network device is not less than the preset distance.

6. An apparatus, applied to a network device, comprising:
at least one processor; and
interface circuitry coupled with the at least one processor;
wherein the at least one processor is configured to cooperate with the interface circuitry to execute one or more instructions to perform operations comprising:
  setting, based on a signal coverage of the network device, a maximum transmit power of common channels of a plurality of carriers;
  setting, based on a total signal transmit power of the network device and the maximum transmit power of the common channels of the plurality of carriers, a maximum transmit power of traffic channels of the plurality of carriers; and
  transmitting, for each scheduling period of a plurality of scheduling periods, the plurality of carriers in the scheduling period, wherein the plurality of carriers in the scheduling period are transmitted based on the maximum transmit power of the common channels of the plurality of carriers, the maximum transmit power of the traffic channels of the plurality of carriers, and a shared transmit power of the traffic channels of the plurality of carriers in the scheduling period; and
  wherein the shared transmit power of the traffic channels of the plurality of carriers in the respective scheduling period is obtained after setting a plurality of shared traffic powers of a scheduling period previous to the respective scheduling period for the traffic channels of the plurality of carriers, and the plurality of shared traffic powers of the previous scheduling period are obtained through determining based on the maximum transmit power of the traffic channels of the plurality of carriers and an actual transmit power of the traffic channels of the plurality of carriers in the previous scheduling period.

7. The apparatus according to claim 6, wherein the at least one processor is further configured to cooperate with the interface circuitry to execute the one or more instructions to perform operations comprising:
  determining an actual transmit power of the traffic channels of the plurality of carriers in a first scheduling period of the plurality of scheduling periods;
  determining, based on the maximum transmit power of the traffic channels of the plurality of carriers and the actual transmit power of the traffic channels of the plurality of carriers in the first scheduling period, a plurality of shared traffic powers of the scheduling period; and
  setting the plurality of shared traffic powers of the scheduling period for the traffic channels of the plurality of carriers, to obtain a shared transmit power of the traffic channels of the plurality of carriers in a next scheduling period relative to the first scheduling period.

8. The apparatus according to claim 7, wherein the at least one processor is configured to cooperate with the interface circuitry to execute the one or more instructions to perform operations comprising:
  determining, for each carrier in the plurality of carriers, whether a power obtained by subtracting an actual transmit power of a traffic channel of the respective carrier in the scheduling period from a maximum transmit power of the traffic channel of the respective carrier is greater than a preset power, and in response to determining that the power obtained by subtracting the actual transmit power of the traffic channel of the respective carrier in the first scheduling period from the maximum transmit power of the traffic channel of the respective carrier is greater than the preset power, using the power as a shared traffic power of the first scheduling period.

9. The apparatus according to claim 7, wherein the at least one processor is configured to cooperate with the interface circuitry to execute the one or more instructions to perform operations comprising:
  determining a plurality of target traffic channels in the traffic channels of the plurality of carriers, wherein the plurality of target traffic channels are channels whose traffic performance needs to be improved; and
  setting the plurality of shared traffic powers of the scheduling period for the plurality of target traffic channels, to obtain a shared transmit power of the plurality of target traffic channels in a next scheduling period relative to the first scheduling period.

10. The apparatus according to claim 6, wherein the at least one processor is further configured to cooperate with the interface circuitry to execute the one or more instructions to perform operations comprising:
  keeping, for each carrier in the plurality of carriers, when the respective carrier is communicating with a near point terminal, the maximum transmit power of the traffic channel of the respective carrier unchanged, increase a quantity of resource blocks (RBs) occupied by the traffic channel of the respective carrier, and decrease a power spectrum density of the traffic channel of the respective carrier, wherein a distance between the near point terminal and the network device is less than a preset distance; and keeping, for each carrier in the plurality of carriers, when the respective carrier is communicating with a far point terminal, the maximum transmit power of the traffic channel of the respective carrier unchanged, decrease the quantity of the RBs occupied by the traffic channel of the respective carrier, and increase the power spectrum density of the traffic channel of the respective carrier, wherein a distance between the far point terminal and the network device is not less than the preset distance.

11. A method, comprising:

setting, by a network device based on a signal coverage of the network device, a maximum transmit power of common channels of a plurality of to-be-transmitted carriers;

setting, by the network device based on a total signal transmit power of the network device and the maximum transmit power of the common channels of the plurality of carriers, a maximum transmit power of traffic channels of the plurality of carriers;

keeping, by the network device for each carrier in the plurality of carriers, when the respective carrier is communicating with a near point terminal, the maximum transmit power of the traffic channel of the respective carrier unchanged, increasing a quantity of resource blocks (RBs) occupied by the traffic channel of the respective carrier, and decreasing a power spectrum density of the traffic channel of the respective carrier, wherein a distance between the near point terminal and the network device is less than a preset distance; and keeping, by the network device for each carrier in the plurality of carriers, when the respective carrier is communicating with a far point terminal, the maximum transmit power of the traffic channel of the respective carrier unchanged, decreasing the quantity of the RBs occupied by the traffic channel of the respective carrier, and increasing the power spectrum density of the traffic channel of the respective carrier, wherein a distance between the far point terminal and the network device is not less than the preset distance.

12. The method according to claim ii, further comprising:

transmitting, by the network device for each scheduling period of a plurality of scheduling periods, the plurality of carriers in the respective scheduling period, wherein the plurality of carriers in the respective scheduling period are transmitted based on the maximum transmit power of the common channels of the plurality of carriers, the maximum transmit power of the traffic channels of the plurality of carriers, and a shared transmit power of the traffic channels of the plurality of carriers in the respective scheduling period;

wherein the shared transmit power of the traffic channels of the plurality of carriers in the respective scheduling period is obtained after setting a plurality of shared traffic powers of a scheduling period previous to the respective scheduling period for the traffic channels of the plurality of to-be-transmitted carriers, and the plurality of shared traffic powers of the previous scheduling period are determined based on the maximum transmit power of the traffic channels of the plurality of carriers and an actual transmit power of the traffic channels of the plurality of carriers in the previous scheduling period.

13. The method according to claim 12, wherein after transmitting the plurality of carriers in a first scheduling period of the plurality of scheduling periods, the method further comprises:

determining an actual transmit power of the traffic channels of the plurality of carriers in the first scheduling period;

determining, based on the maximum transmit power of the traffic channels of the plurality of carriers and the actual transmit power of the traffic channels of the plurality of carriers in the first scheduling period, a plurality of shared traffic powers of the first scheduling period; and setting the plurality of shared traffic powers of the first scheduling period for the traffic channels of the plurality of carriers, to obtain a shared transmit power of the traffic channels of the plurality of carriers in a next scheduling period relative to the first scheduling period.

14. The method according to claim 13, wherein determining, based on the maximum transmit power of the traffic channels of the plurality of carriers and the actual transmit power of the traffic channels of the plurality of carriers in the first scheduling period, the plurality of shared traffic powers of the first scheduling period comprises:

determining, for each carrier in the plurality of carriers, whether a power obtained by subtracting an actual transmit power of a traffic channel of the respective carrier in the first scheduling period from a maximum transmit power of the traffic channel of the respective carrier is greater than a preset power, and in response to determining that the power obtained by subtracting the actual transmit power of the traffic channel of the respective carrier in the first scheduling period from the maximum transmit power of the traffic channel of the respective carrier is greater than the preset power, using the power as a shared traffic power of the first scheduling period.

15. The method according to claim 13, wherein setting the plurality of shared traffic powers of the first scheduling period for the traffic channels of the plurality of carriers, to obtain the shared transmit power of the traffic channels of the plurality of carriers in the next scheduling period relative to the first scheduling period comprises:

determining a plurality of target traffic channels in the traffic channels of the plurality of carriers, wherein the plurality of target traffic channels are channels whose traffic performance needs to be improved; and setting the plurality of shared traffic powers of the first scheduling period for the plurality of target traffic channels, to obtain a shared transmit power of the plurality of target traffic channels in a next scheduling period relative to the first scheduling period.

16. An apparatus, applied to a network device, comprising:

at least one processor; and interface circuitry, coupled with the at least one processor;

wherein the at least one processor is configured to cooperate with the interface circuitry to execute one or more instructions to perform operations comprising:

setting, based on a signal coverage of the network device, a maximum transmit power of common channels of a plurality of carriers;

setting, based on a total signal transmit power of the network device and the maximum transmit power of the common channels of the plurality of carriers, a maximum transmit power of traffic channels of the plurality of carriers;

keeping, for each carrier in the plurality of carriers, when the respective carrier is communicating with a near point terminal, the maximum transmit power of the traffic channel of the respective carrier unchanged, increase a quantity of resource blocks (RBs) occupied by the traffic channel of the respective carrier, and decrease a power spectrum density of the traffic channel of the respective carrier, wherein a distance between the near point terminal and the network device is less than a preset distance; and keeping, for each carrier in the plurality of carriers, when the respective carrier is communicating with a far point terminal, the maximum transmit power of the traffic channel of the respective carrier unchanged, decrease the quantity of the RBs occupied by the traffic channel of the respective carrier, and increase the power spectrum density of the traffic channel of the respective carrier, wherein a distance between the far point terminal and the network device is not less than the preset distance.

17. The apparatus according to claim 16, wherein the at least one processor is further configured to cooperate with the interface circuitry to execute the one or more instructions to perform operations comprising:

transmitting, for each scheduling period of a plurality of scheduling periods, the plurality of carriers in the respective scheduling period, wherein the plurality of carriers in the respective scheduling period are transmitted based on the maximum transmit power of the common channels of the plurality of carriers, the maximum transmit power of the traffic channels of the plurality of carriers, and a shared transmit power of the traffic channels of the plurality of carriers in the respective scheduling period;

wherein the shared transmit power of the traffic channels of the plurality of carriers in the respective scheduling period is obtained after setting a plurality of shared traffic powers of a scheduling period previous to the respective scheduling period for the traffic channels of the plurality of to-be-transmitted carriers, and the plurality of shared traffic powers of the previous scheduling period are determined based on the maximum transmit power of the traffic channels of the plurality of carriers and an actual transmit power of the traffic channels of the plurality of carriers in the previous scheduling period.

18. The apparatus according to claim 17, wherein the at least one processor is further configured to cooperate with the interface circuitry to execute the one or more instructions to perform operations comprising:

determining an actual transmit power of the traffic channels of the plurality of carriers in a first scheduling period of the plurality of scheduling periods;

determining, based on the maximum transmit power of the traffic channels of the plurality of carriers and the actual transmit power of the traffic channels of the plurality of carriers in the first scheduling period, a plurality of shared traffic powers of the first scheduling period; and setting the plurality of shared traffic powers of the first scheduling period for the traffic channels of the plurality of carriers, to obtain a shared transmit power of the traffic channels of the plurality of carriers in a next scheduling period relative to the first scheduling period.

19. The apparatus according to claim 18, wherein the at least one processor is configured to cooperate with the interface circuitry to execute the one or more instructions to perform operations comprising:

determining, for each carrier in the plurality of carriers, whether a power obtained by subtracting an actual transmit power of a traffic channel of the respective carrier in the first scheduling period from a maximum transmit power of the traffic channel of the respective carrier is greater than a preset power, and in response to determining that the power obtained by subtracting the actual transmit power of the traffic channel of the respective carrier in the first scheduling period from the maximum transmit power of the traffic channel of the respective carrier is greater than the preset power, using the power as a shared traffic power of the first scheduling period.

20. The apparatus according to claim 18, wherein the at least one processor is configured to cooperate with the interface circuitry to execute the one or more instructions to perform operations comprising:

determining a plurality of target traffic channels in the traffic channels of the plurality of carriers, wherein the plurality of target traffic channels are channels whose traffic performance needs to be improved; and setting the plurality of shared traffic powers of the first scheduling period for the plurality of target traffic channels, to obtain a shared transmit power of the plurality of target traffic channels in a next scheduling period relative to the first scheduling period.

* * * * *